US010372910B2

(12) United States Patent
Martin et al.

(10) Patent No.: US 10,372,910 B2
(45) Date of Patent: Aug. 6, 2019

(54) METHOD FOR PREDICTING AND CHARACTERIZING CYBER ATTACKS

(71) Applicant: Jask Labs Inc., San Francisco, CA (US)

(72) Inventors: Gregory Martin, San Francisco, CA (US); Thomas Piscitell, III, San Francisco, CA (US); David Matslofva, Redwood City, CA (US); Brian Waskiewicz, San Rafael, CA (US); Scott Woods, San Francisco, CA (US)

(73) Assignee: JASK Labs Inc., San Francisco, CA (US)

( * ) Notice: Subject to any disclaimer, the term of this patent is extended or adjusted under 35 U.S.C. 154(b) by 151 days.

(21) Appl. No.: 15/628,520

(22) Filed: Jun. 20, 2017

(65) Prior Publication Data

US 2018/0004948 A1    Jan. 4, 2018

Related U.S. Application Data

(60) Provisional application No. 62/352,313, filed on Jun. 20, 2016.

(51) Int. Cl.
*G06F 21/55* (2013.01)
*G06F 21/56* (2013.01)
(Continued)

(52) U.S. Cl.
CPC .......... *G06F 21/566* (2013.01); *G06F 21/552* (2013.01); *G06F 21/554* (2013.01);
(Continued)

(58) Field of Classification Search
CPC .... G06F 21/566; G06F 21/552; G06F 21/554; G06F 21/577; H04L 63/1425; H04L 63/1441
See application file for complete search history.

(56) References Cited

U.S. PATENT DOCUMENTS 9,166,997 B1 * 10/2015 Guo .................... H04L 63/1433
9,516,053 B1 * 12/2016 Muddu ................ G06F 16/254
(Continued)

OTHER PUBLICATIONS

Saxe, Joshua et al "Deep Neural Network Based Malware Detection Using Two Dimensional Binary Program Features", International Conference on Malicious and Unwanted Software, Oct. 20-22, 2015 (Year: 2015).*

*Primary Examiner* — Noura Zoubair
(74) *Attorney, Agent, or Firm* — Run8 Patent Group, LLC; Peter Miller

(57) ABSTRACT

One variation of a method for predicting and characterizing cyber attacks includes: receiving, from a sensor implementing deep packet inspection to detect anomalous behaviors on the network, a first signal specifying a first anomalous behavior of a first asset on the network at a first time; representing the first signal in a first vector representing frequencies of anomalous behaviors—in a set of behavior types—of the first asset within a first time window; calculating a first malicious score representing proximity of the first vector to malicious vectors defining sets of behaviors representative of security threats; calculating a first benign score representing proximity of the first vector to a benign vector representing an innocuous set of behaviors; and in response to the first malicious score exceeding the first benign score and a malicious threshold score, issuing a first alert to investigate the network for a security threat.

18 Claims, 5 Drawing Sheets

(51) Int. Cl.
 G06F 21/57 (2013.01)
 H04L 29/06 (2006.01)
(52) U.S. Cl.
 CPC ........ *G06F 21/577* (2013.01); *H04L 63/1425* (2013.01); *H04L 63/1441* (2013.01)

(56) References Cited

U.S. PATENT DOCUMENTS

| | | |
|---|---|---|
| 9,998,484 B1* | 6/2018 | Buyukkayhan ....... G06F 16/285 |
| 2014/0215618 A1 | 7/2014 | Amit |
| 2014/0283026 A1 | 9/2014 | Amit et al. |
| 2014/0283050 A1 | 9/2014 | Amit |
| 2016/0261627 A1* | 9/2016 | Lin ......................... H04W 4/18 |
| 2018/0167402 A1* | 6/2018 | Scheidler .............. G06F 21/552 |

* cited by examiner

METHOD FOR PREDICTING AND CHARACTERIZING CYBER ATTACKS

CROSS-REFERENCE TO RELATED APPLICATIONS

This Application claims the benefit of U.S. Provisional Application No. 62/352,313, filed on 20 Jun. 2016, which is incorporated in its entirety by this reference.

TECHNICAL FIELD

This invention relates generally to the field of cyber security and more specifically to a new and useful method for predicting and characterizing cyber attacks in the field of cyber security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
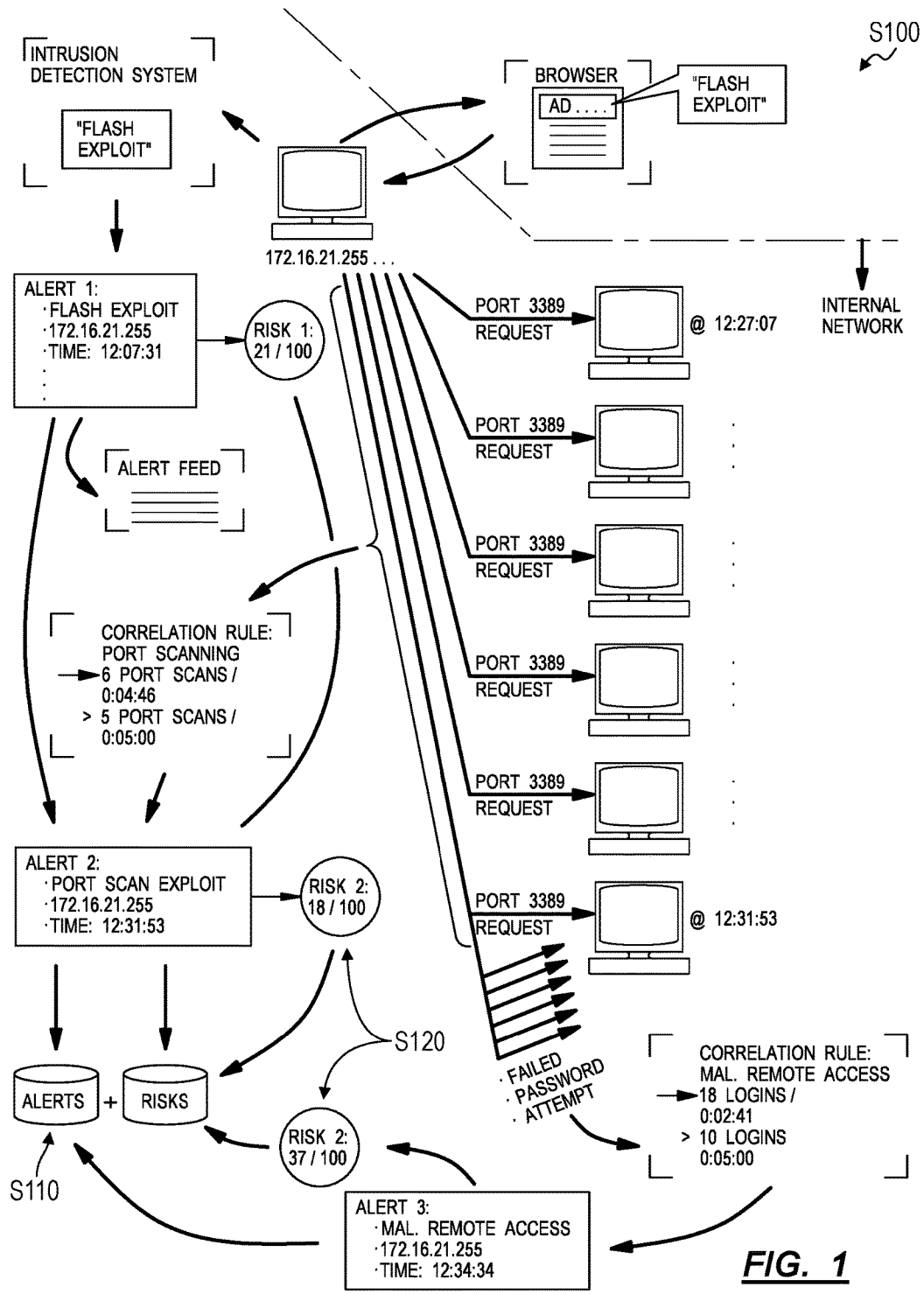
FIG. 1 is a flowchart representation of a first method.
Figure 2:
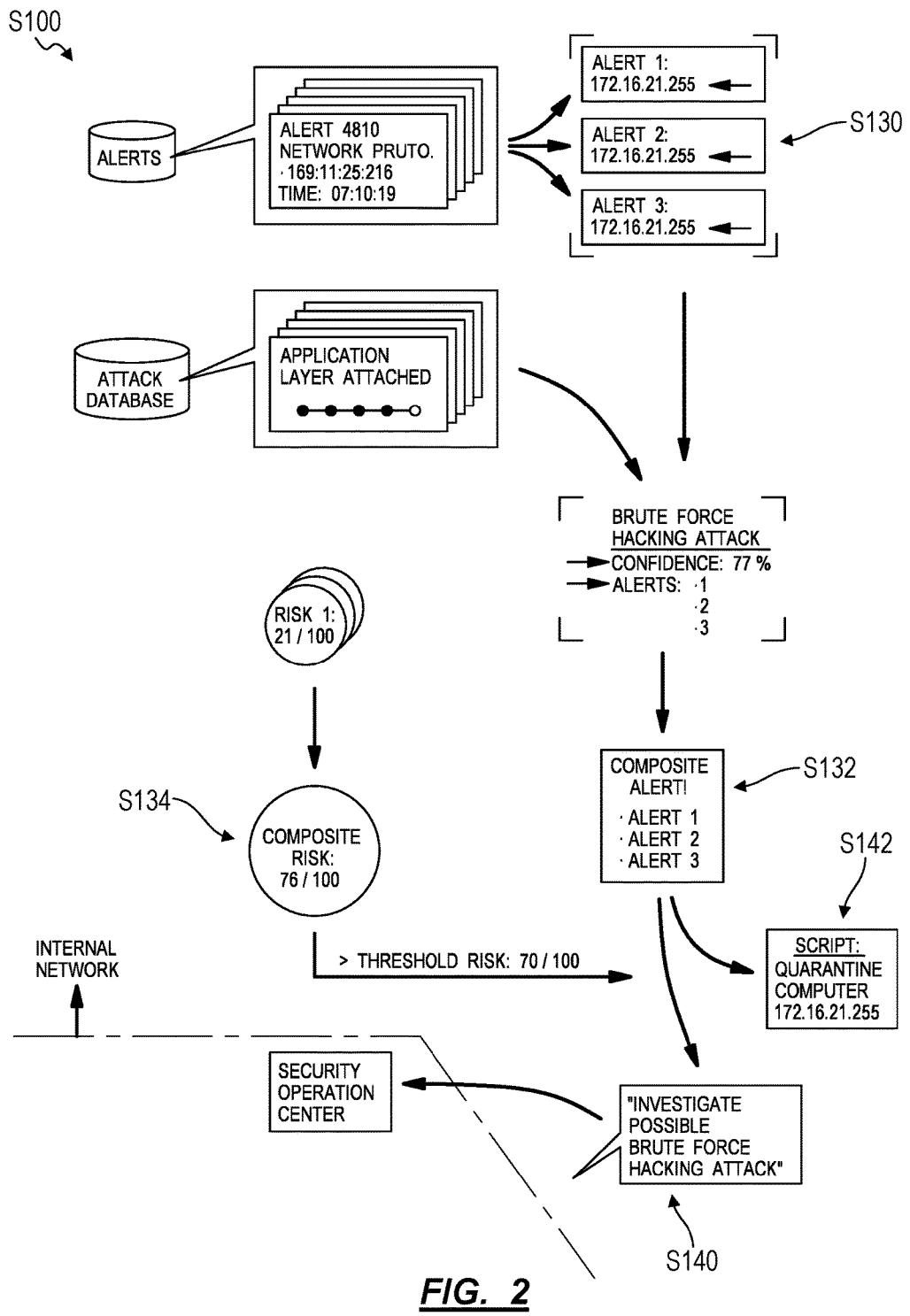
FIG. 2 is a flowchart representation of one variation of the first method.

As shown in FIGS. 1 and 2, a first method S100 for predicting and characterizing cyber attacks includes: accessing a set of signals generated over a period of time in Block S110, each signal in the set of signals representing a possible security threat and containing an asset identification tag identifying a computer at which the possible security threat originated; assigning a risk score to each signal in the set of signals in Block S120; relating a subset of signals in the set of signals based on like asset identification tags in Block S130; compiling the subset of signals into a composite alert in Block S132; aggregating risk scores for signals in the subset of signals into a composite risk score in Block S134; in response to the risk score exceeding a threshold risk score, serving the composite alert to human security personnel in Block S140. The first method S100 can further include, in response to the risk score exceeding the threshold risk score, automatically responding to the composite risk to eliminate the security threat in Block S142.

1.1 Applications

Generally, the first method S100 can be executed in conjunction with a computer network, such as an internal network within a company, corporation, agency, administration, or other organization, to predict and classify cyber attacks based on disparate events occurring on the network over time. In particular, a system executing Blocks of the first method S100 can: access a feed of signals generated by an intrusion detection system—external to the system—layered throughout the network, wherein each signal represents a possible security threat to the network in Block S110; generate additional signals based on preset correlation rules and based on like events occurring on the network; calculate a risk score for each externally-generated signal and internally-generated signal in Block S120; identify related signals, such as based on a common IP address at which the signals originated, in Block S130; group multiple related signals and corresponding risk scores into a single composite alert with a single composite risk score representing an aggregated risk that a group of related signals will culminate in a security breach at the network in Blocks S132 and S134. Thus, if the composite risk score for a composite alert exceeds a threshold risk score, the system can serve the composite alert to human security personnel—such as by pushing a SMS text message, by pushing a notification served through a native application, or by sending an email to an account or computing device associated with a human security technician substantially in real-time—and the human security personnel can initiate an investigation into the possible security threat accordingly.

A system can therefore execute Blocks of the first method S100 in conjunction with a computer network to relate multiple disparate signals via one or more attributes, to associate each signal with a risk, and to condense related signals into a single composite alert and composite risk score representing real risk of a security threat with greater precision than any single signal. Rather than serving all signals to human security personnel who may otherwise become overwhelmed (or "paralyzed") by an influx of disparate and seemingly-unrelated signals corresponding to various actions (or events, "behaviors," "microbehaviors") of assets throughout a network over time, the system can push only a limited number of composite alerts corresponding to sufficiently-high risk security threats—identified by linking multiple disparate signals and risk scores—to human security personnel in order to increase a rate of threat detection within the network while reducing a burden on such human security personnel to manually analyze and relate a multitude of disparate signals. By executing Blocks of the first method S100 to condense a feed of unlinked, disparate signals into a composite alert—highly likely to represent a security threat—and then selectively serving such composite alerts to human security personnel according to the first method S100, the system can reduce a number of signals that human security personnel must review down to a limited number of composite alerts that pose a significant risk to the network and thus increase the rapidity and accuracy of response to these security threats by human security personnel.

The system can thus define a layer between a feed of signals served by various detection mechanisms (e.g., sensors) throughout a network and internal or third-party human security personnel (e.g., a security operation center, or "SOC") who review and respond to security threats; and the system can filter and compile disparate signals in the signal feed into a reduced number of composite alerts served to human security personnel only when a calculated risk that a composite alert represents a real security threat is sufficiently high, thereby reducing error, improving accuracy, and reducing response time for security threats determined by the system to be of at least a minimum risk. For example, the system can automatically link multiple disparate signals generated by other intrusion detection systems within the network substantially in real-time in order to rapidly detect zero-day exploit attacks, and the system can automatically inform human security personnel of such an attack and/or automatically perform various actions to reduce risk or impact of a zero-day exploit attack, such as by automatically quarantining or removing compromised assets from the network substantially in real-time.

Blocks of the first method S100 can be executed by a remote computer system (e.g., a remote server) that remotely monitors events and signals occurring on a network of assets on behalf of an individual, company, corporation, agency, administration, or other organization to detect possible security threats and to prompt security personnel (e.g., a security analyst) to selectively investigate these possible security threats. Alternatively, Blocks of the first method S100 can be executed by one or more local assets on the network.

1.2 Terms

Hereinafter, an "signal" refers to an output of a detection mechanism—such as an external intrusion detection system (IDS) or an intrusion prevention systems (IPS) arranged within the network—in response to detection of an event, action, or behavior by an asset (e.g., a machine and user) on the network that is anomalous to the asset and/or that may represent one or more stages of a possible security threat (e.g., a cyber attack) to the network. The system can also relate multiple like events occurring on the network—such as originating at a common computer and occurring within a particular window of time—based on preset correlation rules and can issue signals for anomalous event sequences. A signal may therefore represent a single instance or multiple instances of a behavior that may indicate an attempt to exploit a particular vulnerability within the network. Similarly, a signal may represent a single instance or multiple instances of a behavior that may indicate an attempt to exploit a particular vulnerability within the network.

Hereinafter, an "attribute" refers to a value descriptive of a signal, such as values contained in signal metadata. For example, an external detection mechanism or the system can store: a signal type, vulnerability type, or attempted exploitation mechanism; a timestamp corresponding to generation of a signal; an asset identification tag (e.g., IP address and user ID, host name, MAC address) corresponding to an asset at which the behavior that triggered the signal originated; a department or group within the network to which the asset belongs; success of a behavior represented in the signal to exploit a vulnerability within the network; etc. in signal metadata. Each signal can thus include metadata defining various parameters of one aspect or "stage" of a possible cyber attack on the network, and the system can compare signal metadata across multiple signals to relate these signals in Block S130.

The system identifies relationships between signals received from detection mechanisms throughout the network over time and compiles a set of related signals into a "composite alert" in Block S132. The system also calculates a risk for each signal, compiles risk scores for each signal represented in a composite alert into a composite risk in Block S134 and executes one or more actions—such as notifying human security personnel or automatically removing a compromised asset from the network—if the composite risk exceeds a threshold risk in Blocks S140 and S142.

1.3 Example

In one example application, the first method S100 is executed by a system in conjunction with an internal computer network within an organization employing multiple people who access the internal network via personal or assigned computing devices. In this example application, an employee working at a first computer connected to the internal network opens a browser on the first computer and navigates to a webpage that contains a malvertising ad. Due to vulnerability at the first computer, a malvertising attack launched at the webpage successfully loads malware onto the computer. However, a detection mechanism at the first computer or elsewhere within the network can detect the presence of new malware on the first computer and can generate a first signal, including a "flash exploit" tag, a timestamp, and an IP address of the first computer, accordingly. The detection mechanism can serve this first signal to a signal feed. In the meantime, a malware removal tool loaded onto the first computing device or onto the network may identify and remove the new malware from the first computing device.

However, should removal of the new malware from the first computer be unsuccessful, the first computer may scan the network for other vulnerabilities at some later time, such as approximately twenty minutes after the initial infiltration event, under control of the new malware. For example, the infected computer can scan the network for other computers with open port 3389s supporting remote desktop access. Repeated attempts to access an open port 3389 by the infected computer can assume an attack pattern, and the system can compare this attack pattern of port 3389 scan events to a port scanning correlation rule that triggers a signal if one computer performs five scans for open port 3389s on the network within a five-minute interval. Thus, if the pattern of port 3389 scan events executed by the first computer exceeds the port scanning correlation rule, the system issues a second signal, including an "attempted remote access" tag, timestamp, and the IP address of the first computer as attributes of the second signal. The malware may be unsuccessful in connecting to an open remote desktop port and may execute another attempt at a later time, or a malware removal tool may automatically identify the new malware repeat remote desktop attempts and remove the new malware from the first computing device.

However, if at some point the first computer—under control of the new malware—successfully connects to a 3389 port of a second computer (e.g., a file server) on the network, the first computing device may attempt to log in to the second computer, such as by entering passwords stored on the first computer or by implementing brute force login techniques. The system compares these attempted logins to an authentication anomaly correlation rule that triggers a signal if one computer performs ten failed login attempts at another remote desktop-enabled computer on the network within a five-minute interval. Thus, the pattern of failed login attempts executed by the first computer exceeds the authentication anomaly correlation rule, the system issues a third signal, including a "repeated failed login" tag, a timestamp, and the IP address of the first computer as attributes of the third signal.

The system thus collects a multitude of signals over time in Block S100 and then assigns a risk score to each signal in Block S120, such as by writing a preset risk score for a particular signal type to a signal of the same type or by implementing a risk algorithm to calculate a risk score for a signal based on various attributes of the signal. The system then relates a subset of all collected signals based on the attributes contained in these signals. In this example application, the system: relates the first signal, second signal, and third signal based on a common IP address of the originating computer (i.e., the first computer) in Block S130; creates a composite alert from the related first, second, and third signals in Block S132; sums risk scores for the first, second, and third signals to calculate a composite risk for the composite alert, and pushes the composite alert to a security analyst if the composite risk score exceeds a threshold risk score.

In this example application, the system and external detection mechanisms throughout the network may also issue signals originating at the first computer but otherwise unrelated to the malvertising attack before, during, and/or after generation of the first, second, and third signals. The system can link disparate signals at multiple levels or in multiple stages. For example, the system can first link the first, second, third, and various other signals by a common origin (e.g., the IP address of the first computer); and then implement pattern matching techniques to match the sequence of the flash exploit event, attempted remote access event, and repeated failed login event represented in the first, second, and third signals to a template malware pattern in order to confirm a link between the first, second, and third signals and to characterize the corresponding composite alert as a malware attack. The system can then aggregate risk scores for the first, second, and third signals—to the exclusion of risk scores of other signals originating at the first computer but not related to a malware attack or indicated in a template malware pattern—to calculate a composite risk score for the composite event. The system can thus characterize a sequence of signals in Block S132 to confirm a link between disparate signals in Block S130 such that the system may generate a composite alert representing events related to a single cyber attack case and corresponding to a composite risk score that accurately portrays a risk inherent in the single cyber attack case.

1.4 Signals

Block S110 of the first method S100 recites accessing a set of signals generated over a period of time in Block S110, wherein each signal in the set of signals represents a possible security threat and containing an asset identification tag identifying a computer at which the possible security threat originated. Generally, in Block S110, the system accesses signals generated by external detection mechanisms layered throughout the network. For example, detection mechanisms within the network can serve signals to a common feed or common signal database, and the system can tap into this feed or signal database to access new and old signals over time.

Generally, a cyber attack on a network may occur over multiple stages, such as initial infiltration followed by command and control, reconnaissance, and then lateral movement. External detection mechanisms throughout the network can detect various stages of an attack independently of other stages in the attack and can issue signals accordingly. For example, detection mechanisms within the network can implement: rule-based penetration detection methods; rule-based anomaly detection methods; signature-based detection methods, such as to monitor packets within the network and to compare these packets with pre-configured and pre-determined attack patterns; statistical anomaly-based detection methods, such as to identify anomalies in network activity (e.g., bandwidth changes, new or unknown protocols, uncommon connections or rate of connection between asset ports, IP address changes); stateful protocol analysis detection techniques, such as to compare actions on the network with predetermined profiles of generally accepted definitions of benign activity; or any other suitable type of threat detection methods.

In this implementation, a security device or security system connected to the network can automatically record an attempted exploitation of a vulnerability within the network in one stage of an attack as a signal, such as: presence of malware and malicious code; instances of tunneling; presence of a virus or worm; repeated unsuccessful login attempts; presence of keylogger or other spyware; and/or malicious rootkits; etc. The security device or security system can similarly issue signals in response to various other detected indicators of compromise (IOCs), such as: unusual outbound network traffic; anomalies in privileged user account activity; geographical irregularities; log-in red flags (e.g., failed logins using nonexistent user accounts); swells in database read volume; abnormally large HTML response sizes; large numbers of requests for the same file; mismatched port-application traffic; suspicious registry or system file changes; DNS request anomalies; unexpected patching of systems; mobile device profile changes; bundles of data in the wrong places; web traffic with unhuman behavior; and/or signs of DDoS activity; etc. The security device or security system can then write an asset identification tag (e.g., an IP address) of a computer at which the attempted exploitation occurred to a new signal and serve this signal to a signal feed. The system can access the signal feed and execute Blocks of the first method S100 described below to link this signal to past signals related to other stages of the same attack.

The system can also execute threat detection methods internally to generate signals. In one implementation, the system implements correlation rules to transform multiple like events—originating at one computer within the network—that may indicate an attack on a network vulnerability. For example, the system can: access a live feed of network events; apply various predefined correlation rules to sequences or patterns of like events in the feed to identify anomalous processes, users, machines, memory, registries, etc. on the network; and generate signals responsive to such multi-event anomalies.

In this implementation, the system can access a rule database of correlation rules, wherein each correlation rule includes a statistical algorithm that defines a threshold number of like events (e.g., five remote access attempts by one computer) within a window of time (e.g., five minutes) as abnormal and that triggers signals accordingly. In one example, the system implements a port scanning correlation rule that triggers a signal for possible malicious port scanning in response to a sequence of at least a threshold number (e.g., five) of connection attempts to a particular port (e.g., port 3389 for remote desktop access) by one computer on the network within a defined window of time (e.g., within a five-minute interval). This example, the system can implement multiple port scanning correlation rules, including: a remote access port scanning rule that triggers a signal for possible malicious remote access attempt in response to a sequence of at least five connection attempts to port 3389 of other computers on the network by a particular computer on the network within a five-minute interval; a masquerading port scanning rule that triggers a signal for possible web filtering circumvention in response to a sequence of at least ten connection attempts to port 80 of other computers on the network by a particular computer on the network within a three-minute interval.

In another example, the system implements an authentication anomaly correlation rule that triggers a signal for a possible malicious remote access attempt in response to detection of at least a threshold number of (e.g., ten) failed login attempts by one computer to another computer (e.g., a remote desktop-enabled computer) on the network within a defined window of time (e.g., within a five-minute interval). In yet another example, the system implements a virus correlation rule that triggers a signal for a possible virus or worm if more than a threshold number of like data packets are transmitted by one computer to at least a threshold number of (e.g., three) other computers on the network within a defined window of time (e.g., within a one-minute interval). In another example, the system implements a network protocol attack correlation rule that triggers a signal for a possible network protocol attack if an unidentified asset outside of the network is called at least a threshold number of (e.g., 100) times by computers within the network within a defined window of time (e.g., two weeks). In yet another example, the system implements a rogue update correlation rule that triggers a signal for a possible network protocol attack if an asset outside of the network logs in to the network to load a security update at least a threshold number of (e.g., 2) times within a defined window of time (e.g., two months).

Each correlation rule applied by the system can trigger an event given a preset static frequency of a particular type of event on the network. Alternatively, the system can dynamically adjust a like-event frequency specified in a correlation rule to trigger a signal. For example, the system can implement machine learning techniques to increase or decrease a like-event frequency defined in a correlation rule based on security threat investigation data, security breach data, and feedback received from the human security personnel, such as in the form of event or signal labels, over time. The system can also apply correlation rules that define range of time windows for repeated like events. For example, the system can implement a virus correlation rule that defines a time window less than one minute in duration in order to enable the system to rapidly issue a signal during a zero-day exploit attack, and the system can implement a port scanning correlation rule that defines a time window of multiple days or weeks in order to detect manual hacking into the network. However, the system can implement any other type and number of correlation rules configured to trigger signals in response to one event or in response to multiple like events occurring on the network during time windows of any other duration.

1.5 Risk

Block S120 of the first method S100 recites assigning a risk score to each signal in the set of signals. Generally, in Block S120, the system associates a signal with a risk score indicating a risk or likelihood that one or more events represented by the signal corresponds to a cyber attack.

In one implementation, the system accesses a lookup table or other risk database containing preset risk scores for various signal types; as a new signal is received at an external signal feed or generated internally, the system retrieves a risk score—corresponding to a type of the new signal—from the risk database and stores this risk score with the new signal, such as in the new signal's metadata. The system can thus contain or access a risk database including a single present risk score per signal type that may be output by another detection mechanism on the network or generated internally by the system. Alternatively, for a particular signal type, the risk database can store multiple preset risk scores, wherein each preset risk score corresponds to one of various possible attribute values of a signal of the particular signal type; the system can thus select a particular risk score—from multiple preset risk scores for a given signal type—for a new signal based on one or more attributes stored in the new signal's metadata. For example, the risk database can store a high risk score (e.g., "61/100") for a particular signal type (e.g., a signal type relating to spear phishing attacks) originating at a computer assigned to an employee with a corporate title (e.g., CEO, CTO); the risk database can store a low risk score (e.g., "44/100") for the same signal type originating at a computer assigned to a lower-level manager or employee within the same corporation; and the system can select from the high risk score and the low risk score for a new signal based on an employee title linked to the asset identification tag contained in the new signal.

Yet alternatively, the system can calculate a risk score for a new signal based on various attributes of the new signal before storing this calculated risk score with the new signal. In this implementation, the system can implement a common risk algorithm or various risk algorithms unique to each signal type output by the other detection mechanisms on the network and/or internally by the system. For example, the system can retrieve a risk algorithm specific to a type of a new signal from a risk database and then pass a total number of like actions (e.g., failed password attempts by one computer, port 3389 scan events by one computer) and/or a like action frequency (e.g., a number of failed password attempts within a five-minute interval) defined within the new signal into the selected algorithm to calculate a risk score for the new signal; the system can output a risk score that is proportional to a number or frequency of like events represented by a signal. In another example, the system can select a risk algorithm defining a correlation between the value or visibility of an employee assigned a particular computer and the risk score for a corresponding signal type originating at the particular computer; in this example, the system can calculate greater risk scores for signals originating from computers assigned to employees with corporate titles, to employees with remote desktop or remote server access (e.g., IT technicians), and to employees with access to private employee information (e.g., human resources representatives) that signals originating from computers assigned to legal assistants, engineers, or sales people. In yet another example, the system can calculate or augment a risk score for a new signal based on an employee security threat history, such as by increasing a preset risk score—selected as described above—for a new signal if the new signal originated at a computer assigned to an employee who was the source of initial infiltration in a previous cyber attack on the network. Similarly, the system can calculate or augment a risk score for a new signal based on previous risky behavior (e.g., websites visited, emails opened) by an employee assigned to the computer at which the new signal originated. However, the system can calculate a risk score for a new signal based on any other one or more parameters in Block 120.

Therefore, the system can execute Blocks S110 and S120 to condense multiple events of the same type by the same machine on the network into a singular signal associated with a singular risk score representing a risk that the multiple like-events is symptomatic of a security threat to the network. The system can also execute Blocks S110 and S120 to assign a risk score to a new signal, wherein this risk score similarly represents a risk that an event defined in the new signal is symptomatic of a security threat to the network. The system can also execute Block S120 substantially in real-time as each new signal is fed into the signal feed or generated internally by the system.

1.6 Customization

The system can implement a preset list of correlation rules in Block S110 and/or implement static risk scores or static risk algorithms in Block S120. Alternatively, the system can implement a set of correlation rules, risk scores, and/or risk algorithms customized for an individual, company, corporation, agency, administration, or other organization that hosts the internal network. In one example, the system includes a security portal that can be accessed by human security personnel to activate or deactivate signals and correlation rules or to add custom correlation rules, such as for the particular sector in which the organization operates, that the system is to execute when monitoring the network. In this example, human security personnel can also access the security portal to define custom static risk scores or to define custom risk algorithms for various signal types, such as for generic signal types or for custom signal types defined by the human security personnel for the organization.

The system can additionally or alternatively dynamically adjust a risk score or a risk algorithm for a particular signal type. For example, the system can implement machine learning techniques to increase or decrease the risk score for a particular signal type based on security threat investigation data, security breach data, and feedback received from human security personnel, such as in the form of event or signal labels, over time. For example, if signals of a particular type generated at the network over time remain unlinked to confirmed cyber attacks on the network, the system can implement machine learning techniques to reduce a preset risk score or to modify a risk algorithm for the risk type accordingly. The system can therefore implement a custom set of correlation rules, custom correlation rules, custom risk values, and/or custom risk algorithms specific to each network that is monitored by the system.

1.7 Linking Signals

Block S130 of the first method S100 recites relating a subset of signals—in the set of signals—based on like asset identification tags. Generally, in Block S130, the system links multiple disparate signals that may represent various stages of a singular cyber attack. For example, the system can link various disparate signals, each of which represents one of an initial infiltration stage, a command and control stage, a reconnaissance stage, and lateral movement stages of a cyber attack. The system can then compile these related signals into one composite alert in Block S132.

1.7.1 Common Asset Identification Tag

In one implementation, the system links disparate signals based on a common asset identification tag. For example, the system can relate all signals originating at one IP address or at one host name. In another example, the system can relate all signals pointing to or targeting one IP address or host name. The system can link signals spanning an unlimited time window or spanning only a limited time window. For example, for a particular signal indicative of a zero-day exploit attack, the system can define a one-day tolerance window and only link the particular signal to other signals originating within one day before or after the particular signal; however, for a second signal indicative of manual hacking, the system can set a one-year window for the second signal and thus link the second signal and any other signal occurring on the network within one year of the second signal and originating at the same computer on the network.

1.7.2 Pattern Matching

In another implementation, the system matches a set of disparate signals to a known cyber attack sequence and links these signals accordingly. (The system can similarly characterize a set of signals linked by common asset identification tags as a particular type of security threat in order to confirm a relationship between these linked signals.)

In this implementation, the system can maintain and access an attack database containing cyber attack patterns, wherein each cyber attack pattern defines a timeline of one or more initial infiltration, command and control, reconnaissance, and lateral movement stages of a cyber attack. For example, the attack database can contain a cyber attack pattern for each of: a malware injection; a phishing attack (e.g., a spear phishing attack); a social engineering Trojan attack; a malicious data mining attack; a denial-of-service (DoS) attack; a brute force hacking attack; a ransom attack; a zero-day attack; an advanced persistent threat; an unpatched exploit or known vulnerability exploit attack; a network-traveling worm attack; an application layer attack; a network protocol attack; a watering hole attack; a rogue update attack; a password attack; and/or a Man-in-the-Middle attack; etc. In this example, the system can aggregate a set of disparate signals linked by a common asset identification tag of an originating computer, compare this set of disparate signals—in order of timestamps—to cyber attack patterns in the attack database, and identify a nearest match between a particular cyber attack pattern in the attack database and all or a subset of the signals. The system can also discard various signals from the set in order to find a best-match with a particular cyber attack pattern in the attack database, thereby confirming a relationship between a subset of these signals and a possible cyber attack and refuting a relationship between this subset of signals and other signals in the set.

The system can also calculate a confidence score for a best-match between the set (or subset) of signals and can prompt human security personnel (e.g., a security analyst) to manually confirm a matched cyber attack pattern if the confidence score for the best-match is below a threshold score. The system can also prompt human security personnel to manually label a set of signals (e.g., with a particular cyber attack type or as unrelated to a cyber attack) if no match is found or if the confidence score for a best-match with a particular cyber attack pattern is below a threshold score.

However, the system can implement any other methods or techniques to characterize a set of signals and/or to confirm a link between signals.

1.8 Composite Alerts

Block S132 of the first method S100 recites compiling the subset of signals into a composite alert; and Block S134 of the first method S100 recites aggregating risk scores for signals in the subset of signals into a composite risk score. Generally, the system can generate a composite alert representing multiple related signals in Block S132 and can aggregate disparate risk scores for these related signals into one composite risk score for the composite alert in Block S134.

In one implementation, the system generates a new composite alert and writes metadata from a set of linked signals to the new composite alert, such as an origin of the signals (e.g., an asset identification tag), timestamps or a time window encompassing the signals, a timeline of events corresponding to signals in the set, etc. The system can also write a match cyber attack type to the composite tag, such as in a name or description of the composite alert. The system can thus link a set of multiple disparate signals in Block S130, confirm relationships between these signals by characterizing the set of signals as a cyber attack type, and then consolidate multiple seemingly disparate signals into one actionable composite alert that can then be quickly consumed and acted upon immediately by human security personnel.

The system can then sum risk scores for each signal represented in the composite alert to calculate a single composite risk score for the composite alert. The system can also weight various risk scores and sum these weighted risk scores to calculate the composite risk score. For example, the system can apply a greater weight to risk scores calculated from more recent signals and can and apply lower weights to risk scores calculated from older signals. Alternatively, for a set of signals characterized as a particular cyber attack type, the system can map a set of weights for the particular cyber attack type to risk scores for the signals before calculating a composite risk score by summing these weighted risk scores. However, the system can compile risk scores of linked signals into a composite risk score in any other way or according to any other schema.

Furthermore, if a composite risk for a composite alert exceeds a threshold risk (described below) but the system is unable to characterize the composite alert as a particular cyber attack type or is unable to characterize the composite alert as a particular cyber attack type to a suitable degree of confidence, the system can prompt human security personnel to manually label the composite alert, such as following an investigation by the human security personnel. The system can then implement machine learning techniques to generate a template pattern or other labeled model for a new or existing cyber attack type based on feedback received from the human security personnel.

1.9 Actions

Block S140 of the first method S100 recites, in response to the risk score exceeding a threshold risk score, serving the composite alert to human security personnel. Generally, in Block S140, the system responds to a composite risk score exceeding a threshold risk score by executing an action, such as communicating the composite alert with a prompt to begin an investigation to human security personnel or automatically removing an asset from the network.

The system can implement a static risk threshold (e.g., "75/10"), such as a static risk threshold set manually by human security personnel through a security portal, to trigger an action in Block S140. Alternatively, the system can implement a dynamic risk threshold to execute an action in Block S140. For example, the system can implement machine learning techniques to derive a risk threshold from past composite alerts and their corresponding composite risks, human-initiated investigations in response to past composite alerts and corresponding composite risk scores, results of these investigations provided to the system in the form of labels or other feedback by security personnel, and/or security breaches not detected by the system but eventually identified manually, etc. The system can compile these data from one network or across multiple discrete networks and dynamically calculate a new risk threshold based on these data in order to eliminate false negatives, which may lead to security breaches, and to reduce false positives, which burden human security personnel with investigations into non-existent security threats. For example, the system can recalculate a risk threshold upon receipt of additional labeled data or other feedback from security personnel on the same network, on external but related networks, or on any network monitored by the system.

Upon generation of a composite alert and calculation of a corresponding composite risk score, the system can compare the composite risk score to the risk threshold in Block S140. If the composite risk score exceeds the threshold risk score, the system can communicate the composite alert to human security personnel. For example, the system can insert the composite alert—and a corresponding cyber attack type and a prompt to begin an investigation—into an email, into an SMS text message or other text message for a native messaging application, or into a notification for a native security application executing on a smartphone, etc. and push such communication(s) to a security analyst, various security personnel, or a security operation center (or "SOC"), etc. In another example, the system pushes the composite alert and related data to a signal feed or master signal feed in a security operation center. However, the system can communicate a composite alert and related data to security personnel, an analyst, and/or a SOC, etc. in any other way in Block S140.

One variation of the first method S100 further includes Block S142, which recites automatically responding to the composite risk to eliminate the security threat. Generally, in Block S142, the system can automatically execute a remediation action to reduce or eliminate a security threat in response to the composite risk score of a composite alert exceeding the threshold risk score. For example, the system can automatically terminate a process, quarantine files, delete registry keys, take a compromised computer off the network, shift a compromised computer to a quarantine network, and/or automatically initiate a third-party investigation, or execute any other script or function in Block S142. In this implementation, the system can execute generic processes for all security threats in response to a composite risk score that exceeds the threshold risk score. Alternatively, the system can execute attack-type specific processes based on a cyber attack type matched to the composite alert. For example, the system can automatically execute a quarantine script to remove all compromised assets from the network for a composite alert characterized as a network-traveling worm attack or as a zero-day exploit attack. In another example, the system can automatically disconnect the network from all external networks for a composite alert characterized by a malicious data mining attack or an advanced persistent threat.

However, the system can automatically execute any other predefined action, process, or routine in Block S142 in response to composite risk score that exceeds a threshold risk score.

2. Method

Figure 3:
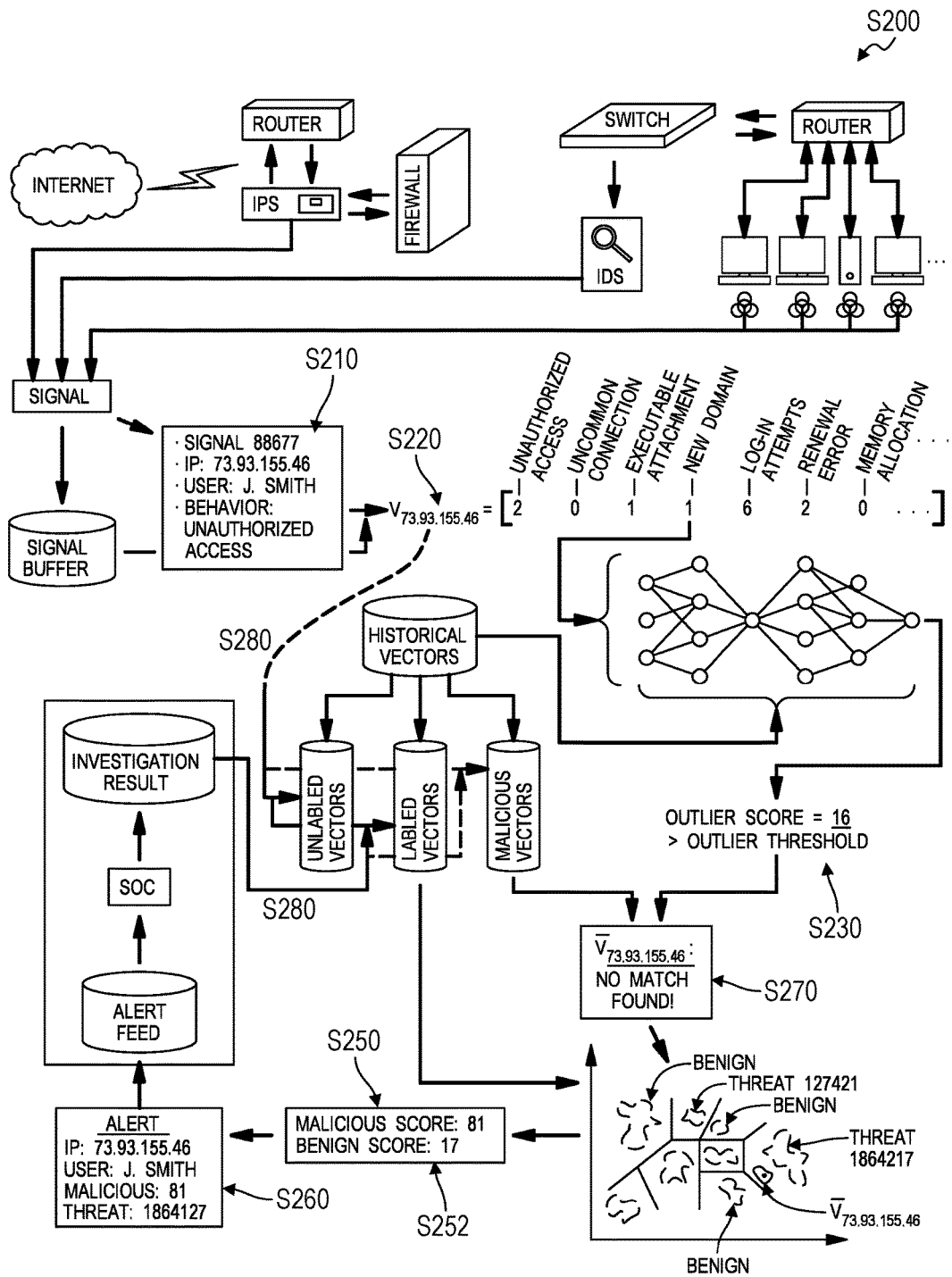
FIG. 3 is a flowchart representation of a second method.
Figure 4:
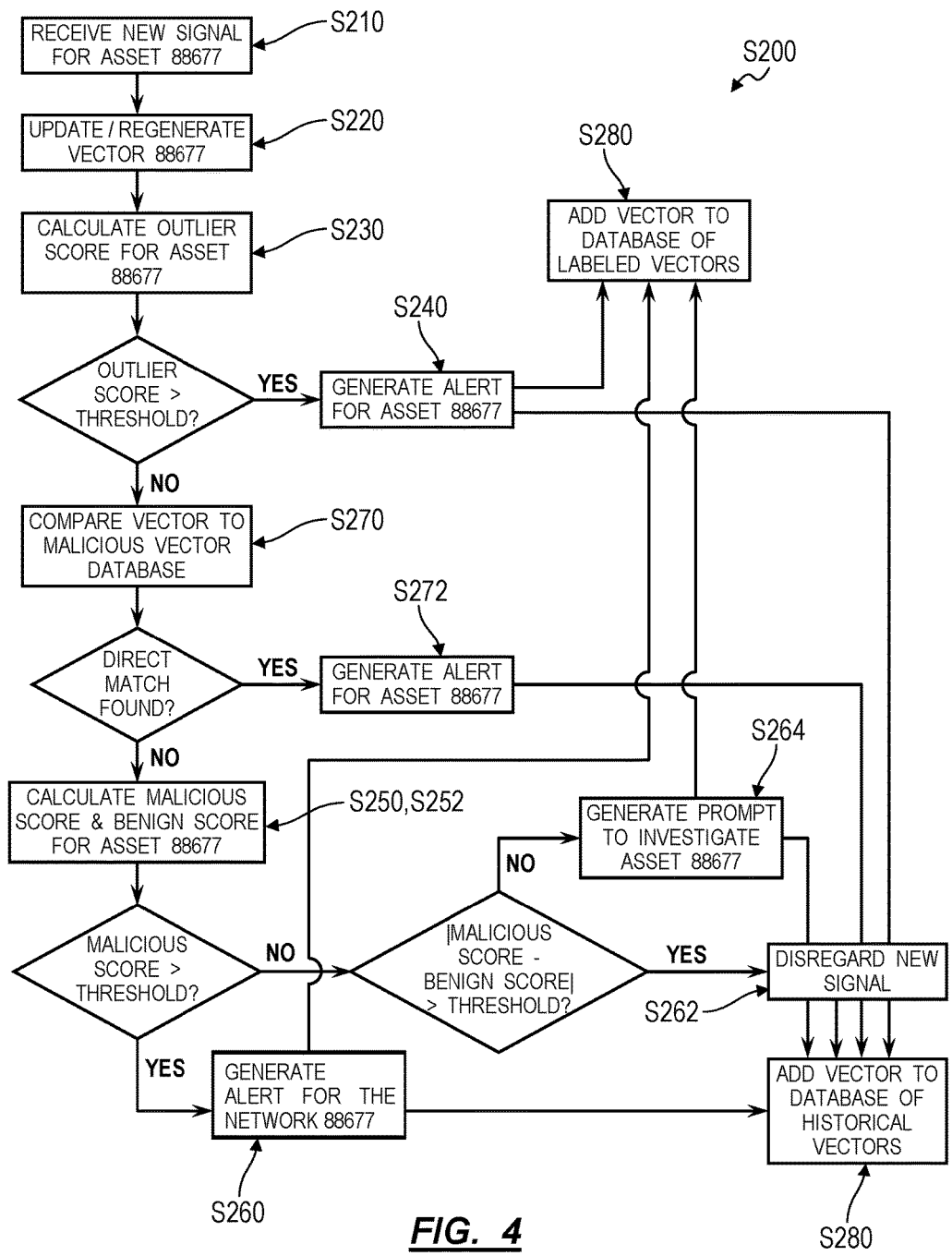
FIG. 4 is a flowchart representation of one variation of the second method.

As shown in FIGS. 3 and 4, a second method S200 for predicting and characterizing cyber attacks includes: receiving a first signal specifying a first behavior of a first asset on a network at a first time in Block S210; compiling the first signal and a first set of signals into a first data structure, each signal in the first set of signals specifying a behavior of the first asset on the network within a first time window of a preset duration up to the first time in Block S220; calculating a first degree of deviation of the first data structure from a corpus of data structures in Block S230, each data structure in the corpus of data structures representing a previous set of behaviors of an asset, in a set of assets, on the network within a time window of the preset duration; in response to the first degree of deviation exceeding a deviation threshold score, issuing a first alert to investigate the first asset in Block S240; calculating a first malicious score proportional to proximity of the first data structure to a first malicious data structure defining a first set of behaviors representative of a first network security threat in Block S250 and calculating a first benign score proportional to proximity of the first data structure to a benign data structure representing an innocuous set of behaviors in Block S252 in response to the deviation threshold score exceeding the first degree of deviation; in response to the first malicious score exceeding the first benign score, issuing a second alert to investigate the network for the first network security threat in Block S260; and, in response to the first benign score exceeding the first malicious score, disregarding the first data structure in Block S262.

Figure 5:
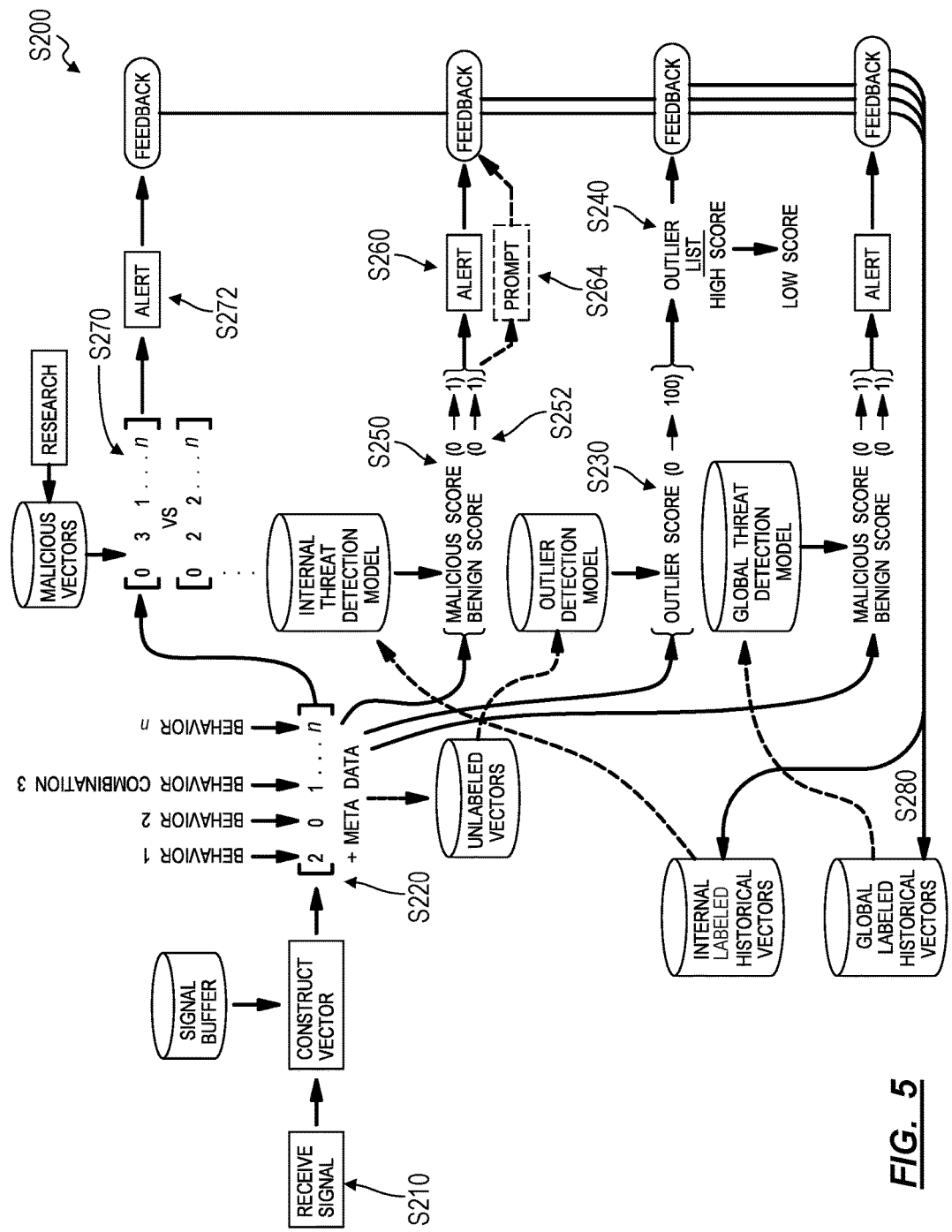
FIG. 5 is a flowchart representation of one variation of the second method.

One variation of the second method S200 shown in FIGS. 4 and 5 includes: receiving a first signal specifying a first behavior of a first asset on a network at a first time in Block S210; compiling the first signal and a first set of signals into a first data structure in Block S220, each signal in the first set of signals specifying a behavior of the first asset on the network within a first time window of a preset duration up to the first time; calculating a first degree of deviation of the first data structure from a corpus of data structures in Block S230, each data structure in the corpus of data structures representing a previous set of behaviors of an asset, in a set of assets, on the network within a time window of the preset duration; in response to the first degree of deviation exceeding a deviation threshold score, issuing a first alert to investigate the first asset in Block S240; in response to the deviation threshold score exceeding the first degree of deviation, accessing a set of malicious data structures defining sets of signals representative of network security threats in Block S270; in response to the first data structure matching a first malicious data structure, in the set of malicious data structures, defining signals representative of a first network security threat, issuing a first alert to investigate the network for the first network security threat in Block S272; in response to a lack of match between the first data structure and a malicious data structure in the set of malicious data structures, calculating a malicious score proportional to proximity of the first data structure to a cluster of malicious data structures defining sets of behaviors representative of a second network security threat in Block S250; and in response to the malicious score exceeding a malicious threshold score, issuing a second alert to investigate the network for the second network security threat in Block S260.

Another variation of the second method S200 includes: receiving a first signal from a sensor implementing deep packet inspection to detect anomalous behaviors of assets on the network in Block S210, the first signal specifying a first anomalous behavior of a first asset on the network at a first time; compiling the first signal and a first set of signals into a first vector representing frequencies of anomalous behaviors, in a predefined set of behavior types, of the first asset on the network within a first time window of a preset duration up to the first time in Block S220; calculating a first malicious score based on proximity of the first vector to a set of malicious vectors defining sets of behaviors representative of network security threats in Block S250; calculating a first benign score proportional to proximity of the first vector to a benign vector representing an innocuous set of behaviors in Block S252; in response to the first malicious score exceeding the first benign score and a malicious threshold score, issuing a first alert to investigate the network for a network security threat in Block S260; in response to the first benign score and the malicious threshold score exceeding the first malicious score, disregarding the first vector in Block S262; and, in response to the first malicious score differing from the first benign score, by less than a threshold difference, issuing a prompt to investigate the first asset in Block S264.

2.1 Applications

The second method S200 can be executed in conjunction with a computer network, such as an internal network within a company, corporation, agency, administration, or other organization, to predict and classify cyber attacks based on disparate events occurring on the network over time. Generally, a system executing Blocks of the second method S200 can: access a feed of signals generated by intrusion detection systems layered throughout the network, such as sensors implementing deep packet inspection to detect anomalous or risky behaviors of assets throughout the network, in Block S210; compile a set of signals specifying behaviors of one asset on the network over a recent time window (e.g., the two weeks) into a new vector representing frequencies of a preset catalog of unique behavior types and/or unique combinations of behavior types in Block S220; and then compare this new vector to past vectors to predict presence of a cyber attack on the network. In particular, the system can compare the new vector to a corpus of historical vectors representing behaviors of other assets on the network over similar time windows (e.g., two-week periods) in the past (e.g., a complete tracked history of the network) to determine whether the recent combination of behaviors of the asset have been observed in the past (e.g., on the same or other asset on the network) in Block S230; because rarity of a combination of behaviors at an asset may correlate strongly to hostility of this combination of behaviors to the network, the system can issue an alert to investigate the asset in Block S240 if the new vector deviates significantly from the corpus of historical vectors. Otherwise, the system can determine that other assets on the network have exhibited similar combinations of behaviors over time windows of the same duration (e.g., two weeks) in the past and execute deeper analysis of the new vector to predict whether recent behaviors of the asset represent a security threat to the network accordingly.

In particular, the system can compare the new vector directly to a set of historical vectors representing confirmed cyber attacks on the network and/or external networks (hereinafter "malicious vectors") in Block S270 and output an alert to investigate the asset or the network generally for a particular cyber attack in Block S272 if the new vector matches a particular malicious vector—in the set of known malicious vectors—tagged with the particular cyber attack. However, if the system fails to match the new vector to a known malicious vector, the system can calculate a malicious score representing proximity of the new vector to known malicious vectors, such as by implementing k-means clustering techniques to cluster a corpus of known malicious vectors, calculating distances between the new vector and these clusters of known malicious vectors, and compiling these distances into malicious confidence scores representing a likelihood that the new vector exemplifies a cyber attack or other threat on the network in Block S250. Similarly, the system can calculate a benign score representing proximity of the new vector to known benign vectors in Block S252, wherein the benign score represents a likelihood that the new vector exemplifies benign activity on the network.

The system can then selectively output an alert to investigate the asset or the network generally for a cyber attack or other threat in Block S260 if the malicious confidence score exceeds the benign confidence score and/or a preset malicious threshold score. Similarly, the system can discard the new vector or otherwise ignore the new vector in Block S262 if the benign confidence score exceeds the malicious confidence score and/or if the malicious confidence score is less than the preset malicious threshold score. Furthermore, if the malicious confidence score approximates the benign confidence score or if malicious and benign confidence scores are both sufficiently low, the system can output an alert to investigate the asset or the network generally in Block S264 in light of such ambiguity in whether the new vector represents malicious or benign behaviors by the asset.

Therefore, the system can selectively serve alerts to human security personnel—such as at a SOC in real-time—to prompt investigation into a possible cyber attack or other security threat on the network if the new vector: is anomalous to the network; matches a malicious vector directly; exhibits strong alignment to historical vectors associated with one or multiple known security threats; or for which ambiguity in malignant and benignant characteristics are uncertain. The system can repeat this process for each asset on the network, such as for each unique combination of machine and user connecting to the network over time.

Generally, a sensor on the network outputs signals that may represent a facet or element of a possible cyber attack on the network, though the risk that an individual behavior specified in a signal represents a security threat may be relatively low. However, rather than serve all signals to human security personnel who may otherwise become overwhelmed (or "paralyzed") by an influx of disparate and seemingly-unrelated signals corresponding to various behaviors of assets throughout a network over time, the system can implement Blocks of the second method S200 to condense a set of signals—specifying behaviors of a particular asset on the network over a limited time window (e.g., two weeks)—into a single alert representing a (significantly) higher confidence in presence of a cyber attack on the network and selectively serve this alert to security personnel for investigation. Therefore, by executing Blocks of the second method S200 to condense a feed of unlinked, disparate signals into a single alert—highly likely to represent a security threat to the network—and then selectively serving this alert to human security personnel in Block S240, S260, or S272, the system can reduce a number of signals that human security personnel must review to a limited number of alerts that pose a significant or greatest risk to the network, reduce a burden on human security personnel to manually analyze and relate a multitude of disparate signals output by sensors on the network over time (e.g., hours, days, or weeks), and thus increase the rapidity and accuracy of response to these security threats by human security personnel.

The system can thus define a layer between a feed of signals served by various detection mechanisms (e.g., sensors) throughout a network and internal or third-party human security personnel who review and respond to security threats; and the system can filter and compile disparate signals in the signal feed into a reduced number of alerts served to human security personnel only when a calculated risk that a new vector—generated in Block S220—represents a real security threat is sufficiently high, thereby reducing error, improving accuracy, and reducing response time for investigating and handling security threats to the network. For example, the system can automatically update a vector—representing behaviors of a particular asset on the network over a two-week time window—with additional signals output by intrusion detection systems on the network substantially in real-time and immediately compare this updated vector to vectors representing frequencies of behaviors common to known cyber attacks (e.g., on the network, across multiple networks within the same market sector, or across all supported networks) in order to rapidly detect zero-day exploit attacks, and the system can automatically inform human security personnel of such an attack and/or automatically perform various actions to reduce risk or impact of a zero-day exploit attack, such as by automatically quarantining or removing the particular asset from the network substantially in real-time.

Blocks of the second method S200 can be executed by a remote computer system (e.g., a remote server, hereinafter the "system") that aggregates and analyzes signals output by sensors on a network on behalf of an individual, a company, a corporation, an agency, an administration, or any other organization in order to detect possible security threats and to prompt security personnel (e.g., a security analyst) to selectively investigate these possible security threats when outliers and high-risk sequences of behaviors by assets on the network are detected. Alternatively, Blocks of the second method S200 can be executed by one or more local assets on the network.

2.2 Example

In one example application, the second method S200 is executed by a system in conjunction with an internal computer network within an organization employing multiple people who access the internal network via personal or assigned computing devices. In this example application, an employee working at a first computer connected to the internal network opens a browser on the first computer and navigates to a webpage that contains a malvertising ad. Due to vulnerability at the first computer, a malvertising attack launched at the webpage successfully loads malware onto the computer. However, a detection mechanism at the first computer or elsewhere within the network detects presence of new malware on the first computer and outputs a first signal, such as specifying a "flash exploit" tag or behavior, a timestamp, and an IP address of the first computer, accordingly. The detection mechanism can serve this first signal to a signal feed, such as in the form of a rolling or circular two-week buffer of all signals read from the network.

Upon receipt of the first signal, the system can: regenerate a first vector for the first computer including empty elements for each behavior type supported by the system; increment each element in the vector by a number of instances that each corresponding behavior type appears in the signal feed for the first computer; and then test the first vector for its outlier score in Block S230, match to a known malicious vector in Block S270, proximity to malicious vectors in Block S250, and/or proximity to benign vectors in Block S252, etc. (Alternatively, the system can: access a first vector representing signals received for the first asset within a current two-week time window; increment a counter at an element within the first vector corresponding to flash exploit behaviors; decrement any elements within the first vector corresponding to behaviors occurring outside of the two-week time window; and test the first vector accordingly.) However: the first computer may otherwise have performed normally within the past two weeks such that the outlier score of the first vector is low in Block S230; lack of a sequence of behaviors matching a known security threat in the first vector may yield no match in Block S270; flash exploit behaviors may be common on the network but rarely result in direct threats to the network such that the malicious confidence score for the first vector remains low; and the system can then discard the first vector as failing to represent a security threat with a sufficient degree of confidence to warrant triggering an alert in Block S260. In the meantime, a malware removal tool loaded onto the first computing device or onto the network may identify and remove the new malware from the first computing device.

However, should removal of the new malware from the first computer be unsuccessful, the first computer may scan the network for other vulnerabilities at some later time—such as minutes or hours after the initial infiltration event—while under control of the new malware. For example, the infected computer may scan the network for other computers with open port 3389s supporting remote desktop access, and the detection mechanism on the first computer or another detection mechanism elsewhere on the network can output one signal—specifying an "attempted remote access" tag, a timestamp of the event, and the IP address of the first computer—for each open port 3389 scan. The detection mechanism can serve this first signal to a signal feed. Upon receipt of each of these signals at the signal feed, the system can: regenerate the first vector including empty elements for each behavior type supported by the system; increment each element in the vector by a number of instances that each corresponding behavior type appears in the signal feed for the first computer; and then retest the first vector, as described above. Once again, generally normal behavior by the first computer within the past two weeks, lack of a sequence of behaviors matching a known security threat, relative commonality of open port 3389 scans, etc. may yield a revised malicious confidence score that still falls below a malicious threshold score (though this revised malicious confidence score may be greater than the previous malicious confidence score for the first computer). In the meantime, a malware removal tool loaded onto the first computing device or onto the network may identify and remove the new malware from the first computing device.

However, the malware may also execute another attempt to connect to a remote access port on another asset on the network at a later time and eventually establish a connection to a 3389 port of a second computer (e.g., a file server) on the network. Once this connection is established, a detection mechanism on the network can output a third signal specifying an "uncommon connection" tag, a timestamp of the event, and the IP address of the first computer if the first computer rarely or has not previously connected to the second computer. The system can again: increment an element in the first vector corresponding to an "uncommon connection" behavior; and then retest the first vector, as described above, which may yield a higher malicious confidence score that still falls below the malicious threshold score (though this revised malicious confidence score may again be greater than the previous malicious confidence score for the first computer).

With a connection to the second computer thus established, the first computing device may attempt to log in to the second computer, such as by entering passwords stored on the first computer or by implementing brute force login techniques. A detection mechanism on the network can then output a fourth signal for failed login attempts, such as if a frequency of failed or attempted login attempts at the second computer meets an authentication anomaly correlation rule that triggers a signal if one computer performs ten failed login attempts at another remote desktop-enabled computer on the network within a five-minute interval. Thus, the detection mechanism can output a fourth signal that includes a "repeated failed login" tag, a timestamp of the login attempt that triggered the fourth signal, and the IP address of the first computer at which the login attempts originated within the network. The system can again: increment an element in the first vector corresponding to this repeated failed login behavior; and then retest the first vector, as described above. In particular, the system can match the set of flash exploit, multiple attempted remote access, uncommon connection, and repeated failed login behaviors represented in the first vector directly to a particular malicious vector—in a set of known malicious vectors—representing a particular known cyber attack in Block S270 and then issue an alert prompting investigation into the first computer or into the network generally for presence of the particular cyber attack in Block S272. Alternatively, if the system determines that the first vector does not sufficiently match a malicious vector in the set of known malicious vectors, the system can pass the first vector through a replicator neural network—trained on vectors generated from signals triggered at substantially all assets on the network during previous two-week intervals—to calculate an outlier score for the first vector in Block S230. If the outlier score is greater than a threshold outlier score, which may indicate that such a set of behaviors has not previously occurred at one asset on the network and may therefore represent a new type of cyber attack on the network, the system can output an alert to investigate the first computer in Block S240. Alternatively, if the outlier score for the first vector is less than the threshold outlier score, which may indicate that such a set of behaviors has previously occurred at one or more assets on the network, the system can compare the first vector to a set of historical vectors, each labeled as either malicious or benign, such as by implementing a k-nearest neighbor classifier to calculate a malicious confidence score representing proximity of the first vector to a cluster of historical vectors labeled as malicious in Block S250 and to calculate a benign confidence score representing proximity of the first vector to a cluster of historical vectors labeled as benign in Block S252. Thus, if the malicious score exceeds both the benign score and a malicious threshold score, the system can generate an alert to investigate the asset or the network generally, such as for presence of any security threat or for a particular cyber attack associated with a cluster of historical vectors nearest the first vector, in Block S260.

However, if the malicious score is still less than both the benign score and the malicious threshold score, the system can discard the first vector in Block S262 and repeat the foregoing process in response to receipt of a next signal specifying an anomalous behavior by the first computer. (Furthermore, if the malicious score differs from the benign score by less than a difference threshold, such as 15%, the system can flag the first vector as ambiguous and generate a prompt or alert to investigate the first computer or the network generally for a security threat in Block S264.)

Therefore, in this example application, the system can interface with external detection mechanisms throughout the network to: record anomalous behavior occurring or originating at an asset on the network into a data structure (e.g., a multi-dimensional rolling vector representing frequencies of behaviors, in a predefined set of anomalous and/or risky behavior types, of the asset within a time window of two weeks); execute a sequence of tests to predict the likelihood of a security threat to the network based on similarities between the data structure and labeled and unlabeled historical data structures of the same format (e.g., same representative sequence of behavior types) generated from past signals generated on the network; and then selectively output alerts to security personnel accordingly. The system can implement similar methods and techniques to simultaneously generate and analyze data structures representing frequencies of behaviors—in the predefined set of anomalous and/or risky behavior types—by other assets on the network within time windows of the same duration, thereby compressing signals originating at many assets on the network over time into a significantly reduced number of alerts representing significantly greater likelihood of cyber attacks on the network to enable more effective and more rapid response by security personnel tasked with securing the network.

2.3 Signals and Behaviors

Block S210 of the second method S200 recites receiving a first signal specifying a first behavior of a first asset on a network at a first time. Generally, in Block S210, the system interfaces with one or more sensors on the network and/or intrusion detection systems executing on machines on the network to collect signals representing behaviors (e.g., events, actions) uncommon to these assets and/or representing behaviors risky to the asset and/or to the network.

In one implementation, the system interfaces with a sensor configured to implement deep packet inspection to detect anomalous behaviors of (i.e., actions not common to) assets on the network and to output signals responsive to anomalous behaviors of assets on the network. In particular, new events occurring at computers within the network may be scanned for possible security threats in real-time or in near real-time by other detection mechanisms—such as external intrusion detection systems (IDS) installed on the network, intrusion prevention systems (IPS) installed on the network, and/or antivirus and similar software installed on machines on the network, as shown in FIG. 3—layered throughout the network. For example, the sensor can implement deep packet inspection to analyze inbound, outbound, and intra-network traffic and to output a variety of signals specifying a single predefined behavior of interest or a predefined combination of behaviors of interest by an asset (e.g., a unique combination of a user and a machine) on the network, such as: unauthorized access by the asset on the network; uncommon connection between the asset and a domain external the network; receipt of an executable attachment from an email address new to the network at the asset; access to a file from a domain not previously connected to by the asset; anomalous network access time by the asset; an anomalous number of login attempts at the asset; a renewal error; an unsupported cipher error; a memory allocation error; a key exchange error; an invalid traversal error; and/or a master key generation error; etc. While such anomalous behaviors may not individually indicate a security threat to the network, occurrence of multiple such behaviors at an asset within a window of time (e.g., a two-week interval) may indicate a stronger likelihood of a security threat.

Thus, when the sensor detects such an anomalous or risky behavior originating or involving a particular asset on the network, the sensor can output a signal specifying the behavior (or a behavior ID) and various metadata, such as: an IP address of the machine; a username of a user logged into the machine at the time the signal fired; and a date and time that the signal fired. The sensor (and/or other intrusion detection systems executing the network) can output such signals to a signal feed, such as to a perpetual signal accounting log or to a rolling (e.g., circular) signal accounting log spanning a limited time window (e.g., two weeks). The system can thus monitor the signal feed over time in Block S210 and regenerate or update data structures unique to each asset on the network in Block S220 as signals associated with these assets are written to the signal feed.

2.4 Data Structures

Block S220 of the second method S200 recites compiling the first signal and a first set of signals into a first data structure, wherein each signal in the first set of signals specifies a behavior of the first asset on the network within a first time window of a preset duration up to (i.e., terminating at) the first time. Generally, in Block S220, the system aggregates signals associated with a particular asset into a single data structure following a preset configuration.

In one example, a data set includes a multi-dimensional vector containing n ordered elements, wherein element i in the vector corresponds to unique behavior or a unique combination of behaviors i in n-number of monitored behavior types (i.e., behavior types that trigger sensors and/or other intrusion detection systems on the network to output signals), as shown in FIGS. 3 and 5. In this example, for each asset on the network (e.g., for each unique combination of one user and one machine on the network), the system can generate a unique vector representing frequencies of behaviors of each behavior type—in the predefined set of n behavior types—occurring at or involving the asset within the time window of preset duration (e.g., two weeks). Thus, for a network hosting m assets with one unique user logging in to each asset over a period of two weeks, the system can generate (and update or regenerate) up to m-number of unique vectors representing frequencies of behaviors of each behavior type of each of m-number of assets within this two-week time interval.

In one implementation, the system generates (or regenerates, updates) a first vector corresponding to a first asset on the network in response to entry of a new signal—specifying the first asset—into the signal feed. In this implementation, the system can: generate (or clear) a first vector containing n null elements; filter the signal feed to most-recent signals generated within the preset window of time; aggregate this subset of signals specifying the first asset; and increment each element in the first vector for each instance of a corresponding behavior type detected in this subset of signals. Alternatively, the system can generate (or regenerate, update) the first vector once per regular interval (e.g., once per hour, once per day) or upon receipt of a threshold number of (e.g., four) signals specifying the first asset.

In another implementation, upon entry of a new signal specifying the first asset into the signal feed (or after a preset time interval or upon receipt of a threshold number of signals specifying the first asset), the system can: extract a first behavior type from the new signal; retrieve the first vector; increment a first element in the first vector corresponding to the first behavior type; detect an old signal in the signal feed associated with the first asset and older than the preset duration (e.g., two weeks); extract a second behavior type from the old signal; and decrement a second element in the first vector corresponding to the second behavior type.

However, the system can generate, update, and/or maintain a vector for each asset on the network over time in any other way and in response to any other event or timer. Furthermore, while described hereinafter as a vector, the system can store asset behavior data in any other data structure, such as in a 1×n array or in a multi-dimensional matrix, etc., in which elements in the data structure correspond to a preset order or schema of behavior types for which sensors and other detection mechanisms on the network are configured to output signals.

2.5 Outliers

Block S230 of the second method S200 recites calculating a first degree of deviation of the first data structure from a corpus of data structures, wherein each data structure in the corpus of data structures represents a previous set of behaviors of an asset—in a set of assets—on the network within a time window of the preset duration; and Block S240 of the second method S200 recites, in response to the first degree of deviation exceeding a deviation threshold score, issuing a first alert to investigate the first asset. Generally, in Block S230, the system tests a new vector associated with a first asset on the network for similarity to many (e.g., all) historical vectors generated previously for assets on the network, as shown in FIGS. 3, 4, and 5. If the vector exhibits sufficient similarity to one or a cluster of historical vectors—such as similar values of elements across the full length of the new vector and one or more historical vectors—the system can determine that the system has previously observed a similar combination and frequency of behaviors of the first asset; the system can then compare the new vector to a subset of historical vectors of known outcomes (e.g., labeled as malicious or benign) in Blocks S250, S252, and/or S270 to predict whether a security threat is present on the network. However, rarity of a sequence of events may be strongly correlated to malignance of this sequence of events. Therefore, if the new vector differs sufficiently from all vectors in the set of historical vectors, the system can label the new vector as an anomaly and immediately issue a prompt or alert to investigate the first asset in Block S240 rather than allocate additional resources to attempting to match or link the new vector to a subset of labeled historical vectors for which the new vector is still an outlier, as shown in FIG. 4. In particular, risk represented by the new vector that is substantially dissimilar from all historical vectors may be less predictable or quantifiable; the system can therefore prompt a human analyst to investigate the first asset associated with the new vector in response to identifying the new vector as an anomaly.

2.5.1 Outlier Detection

In one implementation shown in FIG. 3, the system implements a replicator neural network to calculate an outlier score of the new vector in Block S230. For example, the system can: access a corpus of historical vectors representing frequencies of behaviors—in the predefined set of behavior types—of assets on the network during time windows of the preset duration and preceding the time window represented by the new vector; train a replicator neural network on the corpus of historical vectors; pass the new vector through the replicator neural network to generate a new output vector; and calculate an outlier score (e.g., from "0" to "100") based on a difference between the new vector and the new output vector. In particular, the outlier score of the new vector can represent a degree of deviation of the new vector from a normal distribution of vectors for the network.

In this implementation, the system can train the replicator neural network (or other outlier detection model) on a corpus of all historical vectors generated for assets on the network, such as for all time or within an extended time window (e.g., two years) for all asset types or for a particular asset type of the first asset (e.g., a personal computer, a tablet, a smartphone, a server, a switch, a printer, etc.). For example, the corpus of historical vectors can include both: a first set of historical vectors labeled as either malicious (e.g., labeled with identifiers of known network security threats) or benign following investigation by security analysts; and a second set of unlabeled historical vectors. The corpus of historical vectors can also include a set of vectors generated outside of the network, such as: vectors generated and/or labeled by an ISAC upon detection or characterization of a new security threat or cyber attack; and labeled and/or unlabeled vectors generated at other networks; etc. For example, when the network is first on-boarded onto the system, the system can compare a new vector to labeled and unlabeled historical vectors generated at other networks—such as associated with entities operating in a similar capacity or in a similar market sector as the entity operating the network—in order to enable selective triggering of alerts despite limited historical data for the network; as a corpus of vectors generated for assets within the network increases over time, the system can transition the corpus of historical vectors to include predominantly or exclusively intra-network vectors. However, the system can aggregate labeled and/or unlabeled historical vectors from any other internal or external source. The system can then train the replicator neural network (or other outlier detection model) on this corpus of historical vectors.

Alternatively, the system can implement a k-nearest neighbor classifier to calculate an outlier score representing proximity to an historical vector in the corpus of historical vectors described above. However, the system can implement any other method or technique to calculate an outlier score or otherwise quantify a degree of deviation of the new vector from other vectors representing behaviors of assets previously observed on the network and/or other external networks.

2.5.2 Outlier Handling

The system can then issue an alert to investigate the first asset if the outlier score or degree of deviation exceeds a preset deviation threshold score (e.g., 60/100) in Block S240. For example, the system can generate an alert specifying the first asset (e.g., an IP address of a machine and a username), the outlier score, a list of behaviors and their timestamps represented by the first vector, and a prompt to investigate the first asset specifically, a set of assets on the network in communication with the first asset, or the network generally for anomalous behaviors. The system can then insert this alert into an alert feed or outlier feed monitored by a SOC in Block S240.

The system can repeat this process as new signals are entered into the signal feed to generate new vectors for multiple assets on the network over time and to write alerts for these outlier vectors to the alert feed. However, if multiple outlier vectors are simultaneously present in the alert feed, the system can reorder or rank these alerts by outlier score, including placing outlier vectors associated with greatest outlier scores at the top of the alert feed and placing outlier vectors associated with lower outlier scores further down on the alert feed. For example, after generating a first vector and calculating a first outlier score for the first vector that exceeds the deviation threshold score, the system can: receive a second signal specifying a second behavior of a second asset on the network at a second time; compile the second signal and a second set of signals into a second vector, wherein each signal in the second set of signals specifies a behavior of the second asset on the network within a second time window up to the second time, of the preset duration, and overlapping the first time window; calculate a second degree of deviation of the second vector from the corpus of vectors; issue a second alert to investigate the second asset in response to the second degree of deviation exceeding the deviation threshold score; and rank the first alert ahead of the second alert in response to the first degree of deviation exceeding the second degree of deviation.

However, the system can respond to an outlier vector in any other way in Block S240.

2.5.3 Outlier and Malicious Vector Learning

Furthermore, the system can add the new vector to the corpus of historical vectors and/or to the subset of labeled historical vectors in Block S280, as shown in FIGS. 3, 4, and 5. For example, the system can access a result of an investigation into the asset responsive to the alert generated in Block S240, such as from an investigation database. The system can then label the new vector according to the result, such as by labeling the new vector as malicious (e.g., representing a security threat) or by labeling the new vector as benign according to the result of the investigation. The system can then insert the new vector into the corpus of historical vectors and retrain the replicator neural network (or other outlier detection model) on this extended corpus of historical vectors, such as once per day (e.g., at 12:01 AM daily). Because the new vector is labeled, the system can also append the subset of labeled historical vectors with the new vector and similarly retrain a threat detection model on this extended subset of labeled historical vectors, as described below. Furthermore, if the new vector is labeled as malicious, the system can also insert the new vector into a set of malicious data structures, as described below.

2.6 Direct Threat Match

Block S270 of the second method S200 recites accessing a set of malicious data structures, wherein each malicious data structure in the set of malicious data structures defines a set of signals representative of a network security threat; and Block S272 of the second method S200 recites issuing a second alert to investigate the network for a second network security threat represented by a second malicious data structure in response to the first data structure matching a second malicious data structure in the set of malicious data structures. Generally, in Block S270, the system scans a set of known malicious vectors (i.e., historical vectors representing sequences of behaviors of assets determined to be malignant) for direct matches to the new vector; if such a match is detected, the system can immediately issue an alert to investigate the first asset, automatically quarantine the first asset, or execute any other routine to respond to possibility of a security threat originating at the first asset on the network, as shown in FIGS. 4 and 5.

The system can execute Block S270 prior to executing Block S230 and execute Block S230 only if a direct match between the new vector and the set of known malicious vectors is not detected. Alternatively, the system can execute Block S230 prior to executing Block S270 and execute Block S270 only if the outlier score of the new vector falls below the deviation threshold score.

2.6.1 Direct Threat Detection

In one implementation, the system matches the new vector to a particular malicious vector if the new vector represents at least one instance of every behavior type specified in the particular malicious vector (e.g., at least 1 flash exploit, 1 attempted remote access, 1 uncommon connection, and 1 repeated failed login behavior). Alternatively, the system can match the new vector to a particular malicious vector if the new vector represents at least a minimum number of instances of each behavior type specified in the malicious vector (e.g., at least 1 flash exploit, at least 5 attempted remote access, at least 1 uncommon connection, and at least 6 repeated failed login behaviors). Yet alternatively, the system can match the new vector to a particular malicious vector if the new vector represents the same number of instances of each behavior type specified in the malicious vector (e.g., exactly 1 flash exploit, exactly 5 attempted remote access, exactly 1 uncommon connection, and exactly 6 repeated failed login behaviors).

However, the system can implement any other schema or combination of the foregoing methods to match the new vector to a malicious vector in a prepopulated set of known malicious vectors.

Furthermore, the system can access the set of known malicious vectors that includes: malicious historical vectors generated internally; malicious vectors generated at external networks; and/or vectors generated by an ISAC or other cyber security entity to represent known cyber attack pathways or other network security threats.

2.6.2 Direct Threat Handling

Once the new vector is matched directly to a particular malicious vector in Block S270, the system can automatically generate an alert: containing an identifier of a security threat or cyber attack associated with the particular malicious vector; containing an indicator of a stage of the security threat or cyber attack represented by the particular malicious vector; specifying the first asset (e.g., an IP address of a machine and a username); containing a list of behavior types and their timestamps represented by the new vector; and/or containing a prompt to investigate the first asset specifically, a set of assets on the network in communication with the first asset, or the network generally for anomalous behaviors, such as based on the type and stage of the security threat or cyber attack. The system can then serve this alert to an alert feed at an SOC or otherwise provide this alert to a security analyst to prompt an investigation.

The system can also access a result of such an investigation, label the new vector with this result, and selectively append the subset of labeled historical vectors and/or the set of known malicious vectors accordingly, as described above.

Furthermore, the system can also automatically terminate a process, quarantine files, delete registry keys, take a compromised computer off the network, shift a compromised computer to a quarantine network, and/or automatically initiate a third-party investigation, or execute any other script or function in Block S272, as described above, such as based on a type of the malicious vector matched to the new vector, based on an action tag stored with the malicious vector, or based on a risk associated with the malicious vector, etc.

2.7 Threat Prediction

However, if the outlier score or degree of deviation of the new vector is less than the deviation threshold score and the system fails to detect a direct match between the new vector and a malicious vector in a set of known malicious vectors, the system can: compare the new vector to both known malicious vectors (i.e., vectors representing sequences of behaviors previous associated with cyber attacks or other network security threats) and to known benign vectors (i.e., vectors representing sequences of behaviors previously associated with benign events); and then selectively issue an alert or discard the new vector based on degrees of similarity between the new vector and these malicious and benign vectors, as shown in FIGS. 3 and 4.

2.7.1 Malicious and Benign Scores

Block S250 of the second method S200 recites: calculating a first malicious score proportional to proximity of the first data structure to a first malicious data structure defining a first set of behaviors representative of a first network security threat (such as in response to the deviation threshold score exceeding the first degree of deviation); and Block S252 of the second method S200 recites calculating a first benign score proportional to proximity of the first data structure to a benign data structure representing an innocuous set of behaviors. Generally, in Block S250, the system calculates a proximity of the new vector to one (e.g., a nearest), multiple, or all malicious vectors in the set of known malicious vectors, which may correlate to a degree of risk that a security threat is present on the first asset. Similarly, in Block S252, the system calculates a proximity of the new vector to one (e.g., a nearest), multiple, or all benign vectors in a set of benign vectors (e.g., vectors labeled as representing innocuous sequences of behaviors), which may correlate to a degree of confidence that a security threat is not present on the first asset.

In one implementation, the system: implements k-means clustering techniques and threat labels applied to known malicious and benign vectors to calculate an n-dimensional point (e.g., centroid) characteristic of each duster of malicious vectors and each cluster of benign vectors; and then stores these points in a threat detection model, as shown in FIGS. 3, 4, and 5. The system can then: implement a k-nearest neighbor classifier to calculate a distance—in n dimensions—from the new vector to each point, to a subset of nearest points, or to a single nearest point associated with a security threat in the threat detection model; and store this distance as a malicious score (e.g., from 0% to 100%) for the new vector. Similarly, the system can: implement a k-nearest neighbor classifier to calculate a distance—in n dimensions—from the new vector to each point, to a subset of nearest points, or to a single nearest point labeled as benign in the threat detection model; and store this distance as a benign score (e.g., from 0% to 100%) for the new vector.

Alternatively, the system can implement similar methods and techniques to calculate the malicious and benign scores for the new vector by comparing the new vector directly to individual known malicious and benign vectors.

However, the system can implement any other method or technique to calculate a malicious score based on (e.g., proportional to) proximity of the new vector to: a centroid of a nearest cluster of malicious vectors; centroids of multiple nearest clusters of malicious vectors; centroids of all clusters of malicious vectors; a nearest single malicious vector; multiple nearest malicious vectors; or all known malicious vectors. Similarly, the system can implement any other method or technique to calculate a benign score based on (e.g., proportional to) proximity of the new vector to: a centroid of a nearest cluster of benign vectors; centroids of multiple nearest dusters of benign vectors; centroids of all clusters of benign vectors; a nearest single benign vector; multiple nearest benign vectors; or all known benign vectors.

2.7.2 Malicious Vector

Block S260 of the second method S200 recites, in response to the first malicious score exceeding the first benign score, issuing a second alert to investigate the network for the first network security threat. Generally, in Block S260, the system selectively issues an alert to investigate the network or the first asset for a security threat if the malicious score exceeds both a preset malicious threshold score and the benign score.

In one implementation, in response to the malicious score exceeding the malicious threshold score and/or exceeding the benign score by more than a threshold difference described below, the system generates an alert. For example, the system can populate the alert with: an identifier of a security threat or cyber attack associated with a particular malicious vector or particular cluster of malicious vectors nearest the new vector; an indicator of a stage of the security threat or cyber attack represented by the particular malicious vector or particular cluster of malicious vectors; an identifier of the first asset (e.g., an IP address of a machine and a username); a list of behavior types and their timestamps represented by the new vector; and/or a prompt to investigate the first asset specifically or the network generally, such as based on the type and stage of the security threat or cyber attack. The system can then serve this alert to an alert feed at an SOC or otherwise provide this alert to a security analyst to prompt an investigation in Block S260.

In the foregoing implementation, the system can implement a static, preset malicious threshold score (e.g., 70%). Alternatively, the system can implement various distinct malicious threshold scores based on an origin of a malicious vector nearest the new vector when comparing the new vector to malicious vectors generated both internally and externally in Block S250. For example, processes and sequences of behaviors occurring within the network may be relatively unique to the network such that similarities between the new vector and malicious vector generated externally may be less indicative of a security threat to the network than similarities between the new vector and malicious vector generated internally; the system can therefore implement a lower malicious threshold score for triggering an alert in Block S260 if a malicious vector nearest the new vector originated within the network and implement a higher malicious threshold score for triggering an alert in Block S260 if the malicious vector nearest the new vector originated outside of the network, thereby reducing false positive alerts and reducing strain on security analysts. However, a malicious vector generated and labeled by an ISAC or other cyber security entity may be synthetic and contain a representation of a set of behaviors only directly related to a security threat; therefore, the system can implement a lower malicious confidence score for triggering an alert in Block S260 if the new vector is nearest such a synthetic malicious vector.

In one example, the system calculates a malicious score for the new vector based on proximity of the new vector to a single nearest malicious vector associated with a first security threat at a first stage. In this example, if the nearest malicious data structure represents a set of behaviors previously detected on the network, the system: retrieves a first malicious threshold score for network security threats previously detected on the network; and issues an alert to investigate the network for the first network security threat at the first stage in response to the malicious score of the new vector exceeding both the benign score of the new vector and this first malicious threshold score. However, if the first malicious data structure represents a set of behaviors previously detected on a second network external to the network, the system can: retrieve a second malicious threshold score—greater than the first malicious threshold score—for network security threats previously detected outside of the network; and then issue an alert to investigate the network for the first network security threat at the first stage if the malicious score of the new vector exceeds both the first benign score and the second malicious threshold score.

However, the system can set or adjust a malicious threshold score for triggering an alert in Block S260 in any other way or according to any other schema. The system can implement similar methods and techniques to set a benign threshold score, as described below.

Furthermore, the system can respond to a detected security threat event in any other way, such as by automatically quarantining the first asset in addition to issuing an alert to investigate the first asset, as described above.

2.7.3 Ambiguous Vector

Block S264 of the second method S200 recites, in response to the first malicious score approximating the first benign score, issuing a prompt to investigate the first asset. Generally, if the malicious score and the benign score are substantially similar (e.g., differ by less than a threshold difference), the system can determine that a risk to the network represented by the first vector is indeterminate and thus issue a prompt or alert to investigate the network generally or the first asset specifically for a possible security threat in Block S264; by later labeling the first asset with a result of this investigation and appending the corpus of labeled historical vectors with the new labeled vector, as described below, the system can improve its ability to distinguish similar vectors are malicious or benign in the future.

In particular, a new vector that sits nearly equally between a benign vector and a malicious vector may yield a benign score that differs from a malicious score by less than a difference threshold, which may prevent the system from predicting whether the new vector represents a security threat with a sufficient degree of confidence. For example, a high benign score and a high malicious score may suggest that the new vector is both strongly benign and strongly malicious. Similarly, a low benign score and a low malicious score may suggest that the new vector is both weakly benign and weakly malicious. The system can therefore request further supervision by a security analyst to confirm whether the new vector represents behaviors correlated with a security threat in Block S264. By detecting such an anomalous vector and prompting additional human oversight, the system can enable human analysts to rapidly respond to anomalous sequences of the behaviors; by then incorporating a human analyst's response to this alert into the threat detection model, the system can better predict whether a similar vector generated in the future is malignant or benign.

The system can implement similar methods and techniques to issue an alert or a prompt for additional human supervision if the benign score of the new vector exceeds the malicious score by more than the threshold difference but remains below a benign confidence score. In particular, though the system determines that the new vector is more benign than malicious, the system can issue an alert or prompt to investigate the first asset if the benign score is too low to confirm harmlessness of behavior represented by the new vector with a sufficient degree of confidence.

However, the system can implement any other method or technique to request additional human supervision and in response to any other trigger or event. As described above, the system can generate such an alert that contains various metadata, such as: an identifier of a security threat or cyber attack associated with the nearest malicious vector; an identifier of the first asset; a list of behavior types and their timestamps represented by the new vector; and/or a prompt to investigate the first asset specifically or the network generally, etc.

2.7.4 Innocuous Vector

Block S262 of the second method S200 recites, in response to the first benign score exceeding the first malicious score, disregarding the first data structure. Generally, the system can disregard (e.g., discard) the new vector as (likely) not representing a security threat to the network in Block S262 if the first benign score exceeds the first malicious score, such as by more than the threshold difference. In particular, the system can disregard the first vector as likely not representing a cyber attack or other security threat on the network if the benign score is sufficiently high and/or the malicious score is sufficiently low.

However, as additional signals are generated for the first asset over time, the system can update and retest the new vector accordingly, as described above; once the first vector directly matches a known security threat or is characterized by malicious and benign scores that meet certain conditions, the system can trigger an alert in Blocks S260, S264, or S272, as described above.

Therefore, the system can: ignore the first vector in Block S262 if the malicious and benign scores indicate that the first vector is strongly benign and weakly malicious; trigger an alert in Block S260 if the malicious and benign scores indicate that the first vector is strongly malicious and weakly benign; and prompt deeper review and feedback of the first vector if the malicious and benign scores indicate that the first vector is similarly malicious and benign. The system can also insert the new vector—unlabeled—into the corpus of historical vectors and retrain the replicator neural network (or other outlier detection model) on this extended corpus, as described above.

2.7.5 Global Threat Detection

In one variation shown in FIG. 5, the system can implement the foregoing methods and techniques to test the new vector against an internal corpus of labeled vectors—to determine whether the new vector represents a possible security threat to the network in Block S260, whether the new vector represents a sequence of innocuous behaviors in Block S262, and whether the new vector represent an ambiguous sequence of behaviors in Block S264—wherein the internal corpus of labeled vectors contains vectors generated from signals collected within the network and labeled according to feedback provide by internal and/or external security analysts over time. The system can thus selectively serve alerts to security analysts to investigate an alert or the network generally based on similarities and deviations between a new vectors and the internal corpus of labeled vectors.

However, in this variation, the system can similarly implement the foregoing methods and techniques to test the new vector against a global corpus of labeled vectors, wherein the global corpus of labeled vectors contains vectors generated from signals collected across multiple (e.g., all or multiple similar) networks and labeled according to feedback provide by internal and/or external security analysts over time. For example, if the system fails to correlate the new vector with a threat based on alignment between the new vector and a cluster of vectors—labeled as representing a security threat—in the internal corpus of labeled vectors in Block S260, the system can then test the new vector against the global corpus labeled vectors to confirm that the new vector does not represent a threat in Block S262 or to correlate the new vector with a threat not previously detected on network in Block S260.

The system can thus selectively test the new vector against an internal corpus of labeled vectors and then a global corpus of labeled vectors to detect a possible security threat to the network, as shown in FIG. 5.

2.8 Malicious Vector Learning

Upon receipt of an alert generated in Block S260, S264, or S272, a human analyst at a SOC may investigate the first asset, the first asset and a set of assets that recently communicated with the asset, or the network generally for a cyber attack or other internal or external security threat. The human analyst may also publish results of the investigation to an investigation database.

In one variation, the system: accesses a result of such an investigation from the security operation center, such as from the investigation database; extracts confirmation of presence or absence of a security threat from the result and a unique ID of the security threat if applicable; labels the new vector with these data extracted from the result; and inserts the new vector into the subset of labeled historical vectors (i.e., the subset of historical vectors of known outcomes) in Block S280, as shown in FIGS. 3, 4, and 5. The system can then update or retrain the threat detection model on the new labeled vector, such as upon receipt of the result of the investigation or on a regular interval (e.g., once per day or once per week). If the investigation confirmed that the new vector represents a malicious set of behaviors, the system can also insert the new labeled vector into the set of malicious vectors described above.

Therefore, the system can update various corpuses of labeled and/or unlabeled vectors to include the new vector and a result of an investigation triggered by analysis of the new vector. The system can repeat this process over time as new vectors are generated, analyzed, and selectively investigated in order to refine and maintain internal models for detecting outlier and malicious vectors on the network and selectively triggering investigations into behaviors represented by these vectors.

The system can implement similar methods and techniques to: insert a new vector into a global (i.e., internetwork) corpus of historical vectors; retrain a global replicator neural network (or other outlier detection model) on this extended corpus; insert the new vector into a global set of historical malicious vectors; insert the new vector into a global set of labeled historical vectors; and retrain a global threat detection model on this global set of labeled historical vectors; etc.

2.9 Repetition Over Time

The system can repeat the foregoing methods and techniques over time as new signals are received from sensor and/or other intrusion detection systems layered throughout the network. For example, the system can: receive a second signal specifying a second behavior of a second asset on the network at a second time succeeding the first time in Block S210; compile the second signal and a second set of signals into a second data structure in Block S220, wherein each signal in the second set of signals specifies a behavior of the second asset on the network within a second time window up to the second time, of the preset duration, and overlap the first time window; calculate a second degree of deviation of the second data structure from the corpus of data structures in Block S230; calculate a second malicious score proportional to proximity of the second data structure to the first data structure in Block S250 and calculate a second security threat benign score proportional to proximity of the first data structure to a second security threat benign data structure representing an innocuous set of behaviors in Block S252 in response to the deviation threshold score exceeding the second degree of deviation; and issuing an alert to investigate the network for the second network security threat in response to the second malicious score exceeding the second benign score by more than the threshold difference (and exceeding the malicious threshold score).

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for predicting and characterizing cyber attacks comprising: executing by a computer processor:
- receiving a first signal specifying a first behavior of a first asset on a network at a first time;
- compiling the first signal and a first set of signals into a first data structure, each signal in the first set of signals specifying a behavior of the first asset on the network within a first time window of a preset duration up to the first time;
- calculating a first degree of deviation of the first data structure from a corpus of data structures, each data structure in the corpus of data structures representing a previous set of behaviors of an asset, in a set of assets, on the network within a time window of the preset duration;
- in response to the first degree of deviation exceeding a deviation threshold score, issuing a first alert to investigate the first asset;
- in response to the deviation threshold score exceeding the first degree of deviation:
  - calculating a first malicious score proportional to proximity of the first data structure to a first malicious data structure defining a first set of behaviors representative of a first network security threat;
  - calculating a first benign score proportional to proximity of the first data structure to a benign data structure representing an innocuous set of behaviors;
- in response to the first malicious score exceeding the first benign score, issuing a second alert to investigate the network for the first network security threat; and
- in response to the first benign score exceeding the first malicious score, disregarding the first data structure.

2. The method of claim 1:
- wherein receiving the first signal comprises accessing the first signal generated by a sensor:
  - arranged on the network,
  - implementing deep packet inspection to detect anomalous behaviors of assets on the network, and
  - outputting signals responsive to anomalous behaviors of assets on the network; and
- wherein compiling the first signal and the first set of signals into the first data structure comprises generating the first data structure in response to receipt of the first signal.

3. The method of claim 2:
- wherein receiving the first signal comprises receiving the first signal specifying a combination of the first behavior and a second behavior of the first asset defined by a first machine hosting a first user on the network; and
- wherein compiling the first signal and the first set of signals into the first data structure comprises accessing:
  - a second signal specifying the first behavior and the second behavior of the first asset within the first time window and prior to the first time; and
  - a third signal specifying a third behavior of the first asset within the first time window.

4. The method of claim 2, wherein receiving the first signal comprises receiving the first signal specifying one of: an error event involving the first asset; unauthorized access by the first asset on the network; uncommon connection between the first asset and a domain external the network; and receipt of an executable attachment from an email address new to the network at the first asset.

5. The method of claim 1:
- wherein receiving the first signal comprises receiving the first signal specifying the first behavior, in a predefined set of behavior types, anomalous to the first asset;
- wherein compiling the first signal and the first set of signals into the first data structure comprises generating the first data structure representing frequencies of behaviors, in the predefined set of behavior types, of the first asset during the first time window; and
- wherein calculating the first degree of deviation of the first data structure from the corpus of data structures comprises calculating the first degree of deviation of frequencies of behaviors of each behavior type represented in the first data structure from frequencies of behaviors of each behavior type represented in data structures in the corpus of data structures.

6. The method of claim 5:
- wherein compiling the first signal and the first set of signals into the first data structure comprises generating a first multi-dimensional vector representing frequencies of behaviors of each behavior type, in the predefined set of behavior types, of the first asset within the preset duration of two weeks terminating at the first time;
- wherein calculating the first degree of deviation of the first data structure from the corpus of data structures comprises:
  - accessing the corpus of data structures, each data structure in the corpus of data structures comprising a multi-dimensional vector representing a frequency of behaviors of an asset, in the set of assets, within a duration of two weeks prior to the first time;
  - training a replicator neural network on the corpus of data structures;
  - passing the first multi-dimensional vector through the replicator neural network to generate a first output vector; and
  - calculating an outlier score based on a difference between the first multi-dimensional vector and the first output vector; and
- wherein issuing the first alert to investigate the first asset comprises issuing the first alert to investigate the first asset in response to the outlier score exceeding the deviation threshold score.

7. The method of claim 6:
- wherein accessing the corpus of data structures comprises accessing the corpus of data structures comprising a first set of unlabeled vectors and a second set of vectors labeled with identifiers of known network security threats, the first set of unlabeled vectors and the second set of vectors representing frequencies of behaviors of assets on the network over a second time window comprising the first time window and greater than the preset duration; and
- wherein calculating the first malicious score and calculating the first benign score comprise accessing the corpus of labeled vectors comprising the second set of vectors.

8. The method of claim 1:
further comprising:
- accessing a set of malicious data structures, each malicious data structure in the set of malicious data structures defining a set of signals representative of a network security threat; and
- in response to the first data structure matching a second malicious data structure in the set of malicious data structures, issuing a second alert to investigate the network for a second network security threat represented by the second malicious data structure; and
wherein calculating the first malicious score comprises, in response to lack of a match between the first data structure and a malicious data structure in the set of malicious data structures:
calculating the first malicious score proportional to proximity of the first data structure to the first malicious data structure, in the set of malicious data structures, nearest the first data structure.

9. The method of claim 1:
wherein compiling the first signal and the first set of signals into the first data structure comprises generating a first multi-dimensional vector representing frequencies of behaviors, in a predefined set of behavior types, of the first asset during the first time window;
wherein calculating the first malicious score comprises calculating the first malicious score proportional to proximity of the first multi-dimensional vector to a first cluster of vectors, in a corpus of labeled vectors, representing the first network security threat; and
wherein calculating the first benign score comprises calculating the first benign score proportional to proximity of the first multi-dimensional vector to a second duster of vectors, in the corpus of labeled vectors, representing innocuous network activity.

10. The method of claim 9:
wherein issuing the second alert to investigate the network for the first network security threat comprises:
generating the second alert specifying the first asset and comprising a prompt for an investigation into presence of the first network security threat, associated with the first malicious data structure, on the network; and
inserting the second alert into an alert feed of a security operation center; and
further comprising:
accessing a result of the investigation into presence of the first network security threat on the network from the security operation center;
labeling the first data structure according to the result; and
inserting the first data structure into the corpus of labeled vectors.

11. The method of claim 9, further comprising:
in response to the first malicious score falling within a threshold difference of the first benign score, issuing a prompt to investigate the first asset; accessing a result of an investigation into the first asset from the security operation center; labeling the first data structure according to the result; and inserting the first data structure into the corpus of labeled vectors.

12. The method of claim 9, further comprising:
in response to issuing the first alert to investigate the first asset:
accessing a result of an investigation into the asset responsive to the first alert, the result specifying a second security threat;
labeling the first data structure according to the second security threat; and
inserting the first data structure into the corpus of labeled vectors,
receiving a second signal specifying a second behavior of a second asset on the network at a second time succeeding the first time;
compiling the second signal and a second set of signals into a second data structure, each signal in the second set of signals specifying a behavior of the second asset on the network within a second time window up to the second time, of the preset duration, and overlapping the first time window;
calculating a second degree of deviation of the second data structure from the corpus of data structures;
in response to the deviation threshold score exceeding the second degree of deviation:
calculating a second malicious score proportional to proximity of the second data structure to the first data structure; and
calculating a second security threat benign score proportional to proximity of the first data structure to a second security threat benign data structure representing an innocuous set of behaviors; and
in response to the second malicious score exceeding the second benign score, issuing a third alert to investigate the network for the second network security threat.

13. The method of claim 1, further comprising:
receiving a second signal specifying a second behavior of a second asset on the network at a second time;
compiling the second signal and a second set of signals into a second data structure, each signal in the second set of signals specifying a behavior of the second asset on the network within a second time window up to the second time, of the preset duration, and overlapping the first time window;
calculating a second degree of deviation of the second data structure from the corpus of data structures;
in response to the second degree of deviation exceeding the deviation threshold score, issuing a second alert to investigate the second asset; and
ranking the first alert ahead of the second alert in response to the first degree of deviation exceeding the second degree of deviation.

14. The method of claim 1, wherein issuing the second alert to investigate the network for the first network security threat comprises:
in response to the first malicious data structure defining a set of behaviors previously detected on the network:
retrieving a first malicious threshold score for network security threats previously detected on the network; and
issuing the second alert to investigate the network for the first network security threat in response to the first malicious score exceeding the first benign score and the first malicious threshold score;
in response to the first malicious data structure defining a set of behaviors previously detected on a second network external to the network:
retrieving a second malicious threshold score for network security threats previously detected outside of the network, the second malicious threshold confidence greater than the first malicious threshold confidence; and
issuing the second alert to investigate the network for the first network security threat in response to the first malicious score exceeding the first benign score and the second malicious threshold score.

15. A method for predicting and characterizing cyber attacks comprising: executing a computer processor:
receiving a first signal specifying a first behavior of a first asset on a network at a first time;
compiling the first signal and a first set of signals into a first data structure, each signal in the first set of signals specifying a behavior of the first asset on the network within a first time window of a preset duration up to the first time;

calculating a first degree of deviation of the first data structure from a corpus of data structures, each data structure in the corpus of data structures representing a previous set of behaviors of an asset, in a set of assets, on the network within a time window of the preset duration;

in response to the first degree of deviation exceeding a deviation threshold score, issuing a first alert to investigate the first asset;

in response to the deviation threshold score exceeding the first degree of deviation:
  accessing a set of malicious data structures defining sets of signals representative of network security threats;
  in response to the first data structure matching a first malicious data structure, in the set of malicious data structures, defining signals representative of a first network security threat, issuing a first alert to investigate the network for the first network security threat;

in response to lack of a match between the first data structure and a malicious data structure in the set of malicious data structures, calculating a malicious score proportional to proximity of the first data structure to a cluster of malicious data structures defining sets of behaviors representative of a second network security threat;

calculating a benign score proportional to proximity of the first data structure to a cluster of benign data structures representing innocuous sets of behaviors;

in response to the benign score exceeding the malicious score disregarding the first data structure;

in response to the first malicious score falling within a threshold difference of the first benign score, issuing a prompt to investigate the first asset; and in response to the malicious score exceeding a malicious threshold score and exceeding the benign score, issuing a second alert to investigate the network for the second network security threat.

16. The method of claim 15:
wherein receiving the first signal comprises accessing the first signal generated by a sensor:
  arranged on the network,
  implementing deep packet inspection to detect anomalous behaviors of assets on the network, and
  outputting signals responsive to anomalous behaviors of assets on the network; and
wherein compiling the first signal and the first set of signals into the first data structure comprises generating a first multi-dimensional vector representing frequencies of behaviors, in a predefined set of behavior types, of the first asset during the first time window; and
wherein calculating the first degree of deviation of the first data structure from the corpus of data structures comprises calculating the first degree of deviation of the first multi-dimensional vector from multi-dimensional vectors in the corpus of data structures representing historical frequencies of behaviors, in the predefined set of behavior types, of assets on the network during time windows of the preset duration.

17. A method for predicting and characterizing cyber attacks comprising: executing by a computer processor:
  receiving a first signal from a sensor implementing deep packet inspection to detect anomalous behaviors of assets on the network, the first signal specifying a first anomalous behavior of a first asset on the network at a first time;
  compiling the first signal and a first set of signals into a first vector representing frequencies of anomalous behaviors, in a predefined set of behavior types, of the first asset on the network within a first time window of a preset duration up to the first time;
  calculating a first degree of deviation of the first vector from a corpus of historical vectors, each vector in the corpus of vectors representing a previous set of behaviors of an asset on the network within a time window of the preset duration; and
  in response to the first degree of deviation exceeding a deviation threshold score issuing a first alert to investigate the first asset; and
  in response to the deviation threshold score exceeding the first degree of deviation, calculating a first malicious score based on proximity of the first vector to a set of malicious vectors defining sets of behaviors representative of network security threats;
calculating a first benign score proportional to proximity of the first vector to a set of benign vectors representing innocuous sets of behaviors;
  in response to the first malicious score exceeding the first benign score and a malicious threshold score, issuing a second alert to investigate the network for a network security threat;
  in response to the first benign score and the malicious threshold score exceeding the first malicious score, disregarding the first vector; and
  in response to the first malicious score differing from the first benign score, by less than a threshold difference, issuing a prompt to investigate the first asset.

18. The method of claim 17:
wherein issuing the second alert to investigate the network for the network security threat comprises:
  generating the second alert specifying the first asset and comprising a prompt for an investigation into presence of the network security threat, associated with a first malicious vector nearest the first vector, on the network; and
  inserting the second alert into an alert feed of a security operation center; and
further comprising:
  accessing a confirmation of the network security threat on the network from the security operation center;
  labeling the first vector as representative of the network security threats;
  inserting the first vector into the set of malicious vectors; and
  inserting the first vector into the corpus of historical vectors.

* * * * *